(12) United States Patent
Kadaba

(10) Patent No.: US 6,889,194 B1
(45) Date of Patent: *May 3, 2005

(54) METHOD AND SYSTEM FOR PREPARING AN ELECTRONIC RECORD FOR SHIPPING A PARCEL

(75) Inventor: Nagesh Kadaba, Brookfield, CT (US)

(73) Assignee: United Parcel Service of America, Inc., Atlanta, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1724 days.

(21) Appl. No.: 08/457,732

(22) Filed: Jun. 1, 1995

(51) Int. Cl.[7] .............................................. G06F 17/60
(52) U.S. Cl. ....................................................... 705/1
(58) Field of Search ................................ 395/201, 207, 395/208, 209, 214, 221, 222, 228, 229, 234; 364/464.14, 464.16, 464.2, 479.06, 478.02, 478.03, 478.13, 478.14, 478.15, 468.13, 468.14; 705/400, 404, 406, 410, 7, 8, 9, 14, 21, 22, 28, 29, 34

(56) References Cited

U.S. PATENT DOCUMENTS

| 3,652,795 A | 3/1972 | Wolf et al. ................ 179/2 DP |
|---|---|---|
| RE30,773 E | 10/1981 | Glaser et al. ................ 235/379 |
| 4,392,023 A | 7/1983 | Sears ....................... 179/2 DP |
| 4,677,552 A | 6/1987 | Sibley, Jr. .................... 364/408 |

(Continued)

FOREIGN PATENT DOCUMENTS

| EP | 0 565 290 | 10/1993 |
|---|---|---|
| WO | WO 89/04016 | 5/1989 |
| WO | WO 94/02908 | 2/1994 |
| WO | WO 96/13015 | * 5/1996 |
| WO | WO 96/27171 | * 9/1996 |
| WO | WO 96/38800 | * 12/1996 |

OTHER PUBLICATIONS

"FedEx Ship Delivers Shipping to the Desktop"—Author Unknown Taken from www.fedex.com/pr/archive/PressA.html (2 pages), Nov. 3, 1994.*

United Parcel Service, "Maxitrac Customer Access Software Version 2.8 User Manual" Rev. 1994.

United Parcel Service, "MaxiShip User Manual," Version 3.13 1988–1994.

Kawata, H., "Information Technology of Commercial Vehicles in the Japanese Parcel Service Business," *Proceedings of the International Congress on Transportation Electronics*, pp. 371–382 (Oct. 1992).

Towle, H., "On the Fast Track with TotalTrack: UPS Deploys Mobile Data Service," *Document Delivery World*, pp. 30–31 (Apr./May 1993).

*Primary Examiner*—Joseph Thomas
*Assistant Examiner*—Christopher L. Gilligan
(74) *Attorney, Agent, or Firm*—Alston & Bird LLP

(57) ABSTRACT

The present invention provides a system and method for preparing an electronic shipping record of a parcel. The system utilizes an intelligent telephone to display a parcel shipping procedure as a menu of choices for selection, to store delivery information received via the parcel shipping procedure as a shipping record of a parcel, and to transmit the shipping record to update a parcel database.

24 Claims, 25 Drawing Sheets

U.S. PATENT DOCUMENTS

| | | | | |
|---|---|---|---|---|
| 4,796,180 A | | 1/1989 | Riley | 364/400 |
| 4,799,156 A | * | 1/1989 | Shavit et al. | 395/226 |
| 4,832,204 A | | 5/1989 | Handy et al. | 209/3.3 |
| 4,839,813 A | | 6/1989 | Hills et al. | 364/464.03 |
| 4,859,839 A | | 8/1989 | Tetelman et al. | 235/385 |
| 4,908,770 A | | 3/1990 | Breault et al. | 364/464.02 |
| 4,941,091 A | | 7/1990 | Breault et al. | 364/406 |
| 4,947,333 A | | 8/1990 | Sansone et al. | 364/464.02 |
| 4,951,196 A | * | 8/1990 | Jackson | 395/237 |
| 4,975,841 A | | 12/1990 | Kehnemuyi et al. | 364/401 |
| 4,998,204 A | | 3/1991 | Sansone et al. | 364/464.02 |
| 5,003,472 A | | 3/1991 | Perrill et al. | 364/401 |
| 5,040,132 A | * | 8/1991 | Schuricht et al. | 707/507 |
| 5,050,207 A | | 9/1991 | Hitchcock | 379/96 |
| 5,070,463 A | | 12/1991 | Schuricht et al. | 364/464.02 |
| 5,077,694 A | * | 12/1991 | Sansone et al. | 395/615 |
| 5,146,403 A | | 9/1992 | Goodman | 364/401 |
| 5,153,842 A | * | 10/1992 | Dlugos, Sr. et al. | 364/478.15 |
| 5,157,717 A | | 10/1992 | Hitchcock | 379/96 |
| 5,168,444 A | * | 12/1992 | Cukor et al. | 395/201 |
| 5,195,130 A | * | 3/1993 | Weiss et al. | 379/93.19 |
| 5,198,644 A | | 3/1993 | Pfeiffer et al. | 235/383 |
| 5,220,501 A | | 6/1993 | Lawlor et al. | 364/408 |
| 5,222,018 A | * | 6/1993 | Sharpe et al. | 705/30 |
| 5,245,535 A | | 9/1993 | Weiss et al. | 364/407 |
| 5,262,939 A | | 11/1993 | Vanpoucke | 364/401 |
| 5,274,547 A | | 12/1993 | Zoffel et al. | 364/408 |
| 5,278,947 A | * | 1/1994 | Balga, Jr. et al. | 395/117 |
| 5,310,997 A | | 5/1994 | Roach et al. | 235/375 |
| 5,313,051 A | * | 5/1994 | Brigida et al. | 235/375 |
| 5,319,562 A | * | 6/1994 | Whitehouse | 705/403 |
| 5,341,505 A | | 8/1994 | Whitehouse | 395/800 |
| 5,375,172 A | * | 12/1994 | Chrosny | 380/51 |
| 5,479,000 A | * | 12/1995 | Dvorkis et al. | 235/472.01 |
| 5,481,464 A | * | 1/1996 | Rmasden | 364/464.03 |
| 5,602,742 A | * | 2/1997 | Solondz et al. | 364/464.2 |
| 5,657,378 A | * | 8/1997 | Haddock et al. | 379/93.23 |

* cited by examiner

UNITED PARCEL SERVICE

RECIPIENT

WHICH RECIPIENT WOULD YOU LIKE TO REVIEW?

1. AL APPLEWOOD (CUSTOMER SERVICE)
2. AL GOODWALL (LEGAL)
3. BRIAN JEFFERSON (OPERATIONS)
4. BOB KNIGHT (PUBLIC AFFAIRS)
5. TOM KNIGHT (LEGAL)
6. DOUG SMITH (OPERATIONS)
7. ALLEN SMITH (LEGAL)

EXIT | GO BACK | NEW RECIPIENT | OTHER OPTIONS | ? HELP

UNITED PARCEL SERVICE

SHIPPER INFORMATION

| | |
|---|---|
| SHIPPER ID | 432 445 |
| CONTACT | BILL HANKS |
| COMPANY | XYZ CORPORATION |
| STREET | 1 PEACHTREE ST. S.W. |
| | 50TH FLOOR |
| CITY | ATLANTA |
| STATE | GA |
| ZIP CODE | 30000 |
| TELEPHONE | (404) 555-1212 |

EXIT | | OK | CLEAR | ? HELP

*FIG. 4F*

UNITED PARCEL SERVICE

RECIPIENT

PLEASE SELECT THE RECIPIENT YOU WANT

1. AL APPLEWOOD (CONSUMER SERVICE)
2. AL GOODWALL (LEGAL)
3. BRIAN JEFFERSON (OPERATIONS)
4. BOB KNIGHT (PUBLIC AFFAIRS)
5. TOM KNIGHT (LEGAL)
6. DOUG SMITH (OPERATIONS)
7. ALLEN SMITH (LEGAL)

| EXIT | GO BACK | NEW RECIPIENT | OTHER OPTIONS | ? HELP |

FIG. 6A

UNITED PARCEL SERVICE

RECIPIENT INFORMATION

NAME
COMPANY
STREET

CITY
STATE
ZIP CODE
TELEPHONE

| EXIT | GO BACK | OK | CLEAR | ? HELP |

FIG. 6B

UNITED PARCEL SERVICE

PACKAGE INFORMATION

UPS CUSTOMER SERVICE (AL APPLEWOOD)
2320 WASHINGTON ST., SUIT 110
ONTARIO, CA 91764

NEXT DAY AIR (1 LBS)

EXIT | OK

*FIG. 6K*

UNITED PARCEL SERVICE

PACKAGE REVIEW

DO YOU WANT TO REVIEW OTHER PACKAGES?

GO BACK | YES ☑ | NO ☒

*FIG. 6L*

FIG. 7C
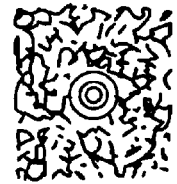
FIG. 7B
FIG. 7A

UNITED PARCEL SERVICE

TOTAL TRACK

TRACKING NUMBER: 30Z598357035598333
SERVICE LEVEL: NEXT DAY AIR

CURRENT STATUS: DELIVERED

STATUS DETAIL: DELIVERY DATE: 02/01/94
DELIVERY TIME: 10:20 AM
RECEIVED BY S. SMITH

EXIT | | OK | | ? HELP

UNITED PARCEL SERVICE

TRACK BY DATE

PLEASE ENTER THE SHIPPING DATE
FOR THE PACKAGE YOU'RE TRACKING

☐ 05/09/95

EXIT | GO BACK | OK | CLEAR | ? HELP

UNITED PARCEL SERVICE

TRACK BY DATE

PLEASE SELECT FROM THE LIST OF PACKAGES SCHEDULED ON 05/09/95.

- [1] UPS CUSTOMER SERVICE    4Z12987459875
- [2] UPS LEGAL    4Z45543485378

| EXIT | GO BACK | SORT BY NUMBERS | SEARCH | ? HELP |

*FIG. 9E*

UNITED PARCEL SERVICE

TRACK BY RECIPIENT

PLEASE SELECT THE ONE YOU WANT.

- [1] AL APPLEWOOD (CUSTOMER SERVICE)
- [2] AL GOODWALL (LEGAL)
- [3] BRIAN JEFFERSON (OPERATIONS)
- [4] BOB KNIGHT (PUBLIC AFFAIRS)
- [5] TOM KNIGHT (LEGAL)
- [6] DOUG SMITH (OPERATIONS)
- [7] ALLEN SMITH (LEGAL)

| EXIT | GO BACK | SORT BY COMPANY | SEARCH | ? HELP |

*FIG. 9F*

UNITED PARCEL SERVICE

RECIPIENT

| | |
|---|---|
| NAME | AL APPLEWOOD |
| COMPANY | UPS CUSTOMER SERVICE |
| STREET | 2320 WASHINGTON ST. |
| | SUIT 110 |
| CITY | ONTARIO |
| STATE | CA |
| ZIP CODE | 91764 |
| RESIDENTIAL | NO |

| EXIT | GO BACK | OK | CLEAR | ? HELP |

FIG. 11A

UNITED PARCEL SERVICE

RECIPIENT INFORMATION

NAME
COMPANY
STREET

CITY
STATE
ZIP CODE
RESIDENTIAL

| EXIT | GO BACK | OK | CLEAR | ? HELP |

FIG. 11B

METHOD AND SYSTEM FOR PREPARING AN ELECTRONIC RECORD FOR SHIPPING A PARCEL

TECHNICAL FIELD

The present invention relates generally to the shipping of parcels, and more particularly to an improved system for, and method of, preparing an electronic record for shipping a parcel.

BACKGROUND OF THE INVENTION

Parcel delivery companies, such as "UNITED PARCEL SERVICE, maintain computerized shipping records for the purposes of tracking parcels. Traditionally, a shipping customer obtains tracking information by calling a customer service representative, who accesses his or her company's computer system and relays the requested information to the customer. Package shipping records are manually keyed into a company's computer system from parcel shipping forms, which are completed by customers. Thus, to provide an interface between parcel delivery companies and customers, this method of shipping and tracking parcels requires the use of key entry operators and customer service representatives. Consequently, the method is both labor intensive and costly. Moreover, the method can be frustrating for customers when no customer service representative is immediately available to provide needed information.

More recently, parcel delivery companies have developed for large customers tracking software that operates in a personal computer environment. The tracking software permits customers to directly access a delivery company's computer system and obtain needed information. Thus, customers with a personal computer and the tracking software no longer need to interact with a customer service representative every time information is required. Accordingly, the tracking software permits delivery companies to operate more efficiently because fewer customer service representatives are needed.

Parcel delivery companies have similarly developed shipping software for customers. The shipping software allows customers to enter their shipping records into personal computers, from where the records are uploaded to the delivery company's computer system. Accordingly, the shipping records no longer need to be manually keyed into the delivery company's computer system. Further, the shipping software prints machine readable parcel labels that allow the parcels to be machine sorted, which is both more efficient and more accurate. Thus, the shipping software, along with the tracking software, permits parcel delivery companies to provide shipping customers with improved, more efficient service.

Typically, however, only large volume shipping customers can take advantage of such shipping and tracking software. This is because small volume shipping customers, which are mostly small businesses, may lack the required personal computer system, the desire to allocate resources to purchase such a system, and/or the expertise to operate the software. Accordingly, small volume shipping customers must rely on the traditional method if shipping and tracking parcels. As a consequence, parcel delivery companies must provide key entry operators and customer service representatives as an interface with small volume shipping customers.

Therefore, a need exists in the art for a system for, and method of, providing small volume shipping customers with direct access to a parcel delivery company's computer system. The method and system should be affordable and intuitive.

SUMMARY OF THE INVENTION

The present invention meets the above-described need in the art by providing a method and system for preparing an electronic shipping record of a parcel. The system utilizes an intelligent telephone to display a parcel shipping procedure as a menu of choices for selection, to store delivery information received via the parcel shipping procedure as a shipping record of a parcel, and to transmit the shipping record to update a parcel database.

Generally described, the present invention provides an intelligent telephone for preparing an electronic shipping record of a parcel. The intelligent telephone includes a processor connected to an input device for receiving information, a data transfer device for receiving and transmitting information, an information storage device, and a screen device for displaying information. The processor is configured to store a parcel shipping procedure and to display the parcel shipping procedure on the screen device as a menu of choices for selection.

The processor receives delivery information relating to a parcel via the parcel shipping procedure. The delivery information is stored as a shipping record of the parcel. Preferably, the delivery information includes a recipient, a delivery address, a shipping date, and an identification number.

In a preferred embodiment, the data transfer device is selectively operable to receive a parcel shipping procedure from a central computer of a parcel delivery company and to transmit shipping records to the central computer. The central computer is equipped with a modem to receive the shipping records and to transmit updates of the parcel shipping procedure to the intelligent telephone.

The present invention might typically be used as follows. A parcel shipping procedure is downloaded from a central computer of a parcel deliver company to the office of a shipping customer. The parcel shipping procedure is received by an intelligent telephone and stored to the telephone's memory device.

To prepare a parcel shipping record, a customer enters a selection for shipping services from a menu displayed on the screen device of the intelligent telephone. In the preferred embodiment, non-selectable features of the parcel shipping procedure are disabled and displayed in a dimmed style to indicate the same. Also, context-based help is displayed upon request.

The customer selects a recipient, a service level, and additional services wanted for a parcel, each of which is displayed on the screen as a menu of choices for selection. These selections comprise delivery information for the parcel and are stored as a shipping record of the parcel.

Upon completion of the shipping record, a label is printed for affixation to the parcel. Preferably, the label is printed from a bit map so that an inexpensive printer can be used and is machine readable so that the parcel can be sorted by machine. After printing is finished, the shipping record is transmitted to the central computer to indicate that the parcel is ready for shipment and to update a tracking database. Additionally, a billing record associated with shipping the parcel is determined from the shipping record to update a billing database.

Using the intelligent telephone, a shipping customer can access the tracking database and track a parcel by identification number, by date of shipment, and by the recipient. Similarly, a shipping customer can access the billing database to track shipping expenses.

Thus, it is an object of the present invention to provide an improved system for, and method of, preparing an electronic shipping record of a parcel.

It is a further object of the present invention to provide an intelligent telephone for preparing an electronic shipping record of a parcel.

It is another object of the present invention to provide an intelligent telephone for printing machine readable parcel labels.

It is another object of the present invention to provide an intelligent telephone for validating zip code information of a parcel.

It is another object of the present invention to provide an intelligent telephone for generating an identification number of a parcel.

It is another object of the present invention to provide an intelligent telephone for displaying a recipient shipping list as part of a parcel shipping procedure.

It is another object of the present invention to provide an intelligent telephone for accessing a tracking database.

It is another object of the present invention to provide an intelligent telephone for accessing a billing database.

It is still another object of the present invention to provide an intelligent telephone for transmitting information to a central computer to indicate a parcel is ready for shipment.

Other objects, features and advantages of the present invention will become apparent upon examining the following description of preferred embodiments of the invention, when taken in conjunction with the drawings and the appended claims.

BRIEF DESCRIPTION OF THE DRAWINGS

FIGS. 4A–4F are a sequence of screen displays from the user's perspective showing the process of entering a shipping menu and a tracking menu in accordance with the preferred embodiment of the present invention.

FIGS. 7A–7C are machine readable labels printed during the process of preparing a shipping record in accordance with the preferred embodiment of the present invention.

FIGS. 9A–9F are a sequence of screen displays from the user's perspective showing the process of tracking a parcel with the intelligent telephone of the present invention in accordance with the preferred embodiment.

FIGS. 11A–11C are a sequence of screen displays from the user's perspective showing the process of updating a recipient shipping list stored in the intelligent telephone of the present invention in accordance with the preferred embodiment.

DETAILED DESCRIPTION

Figure 1:
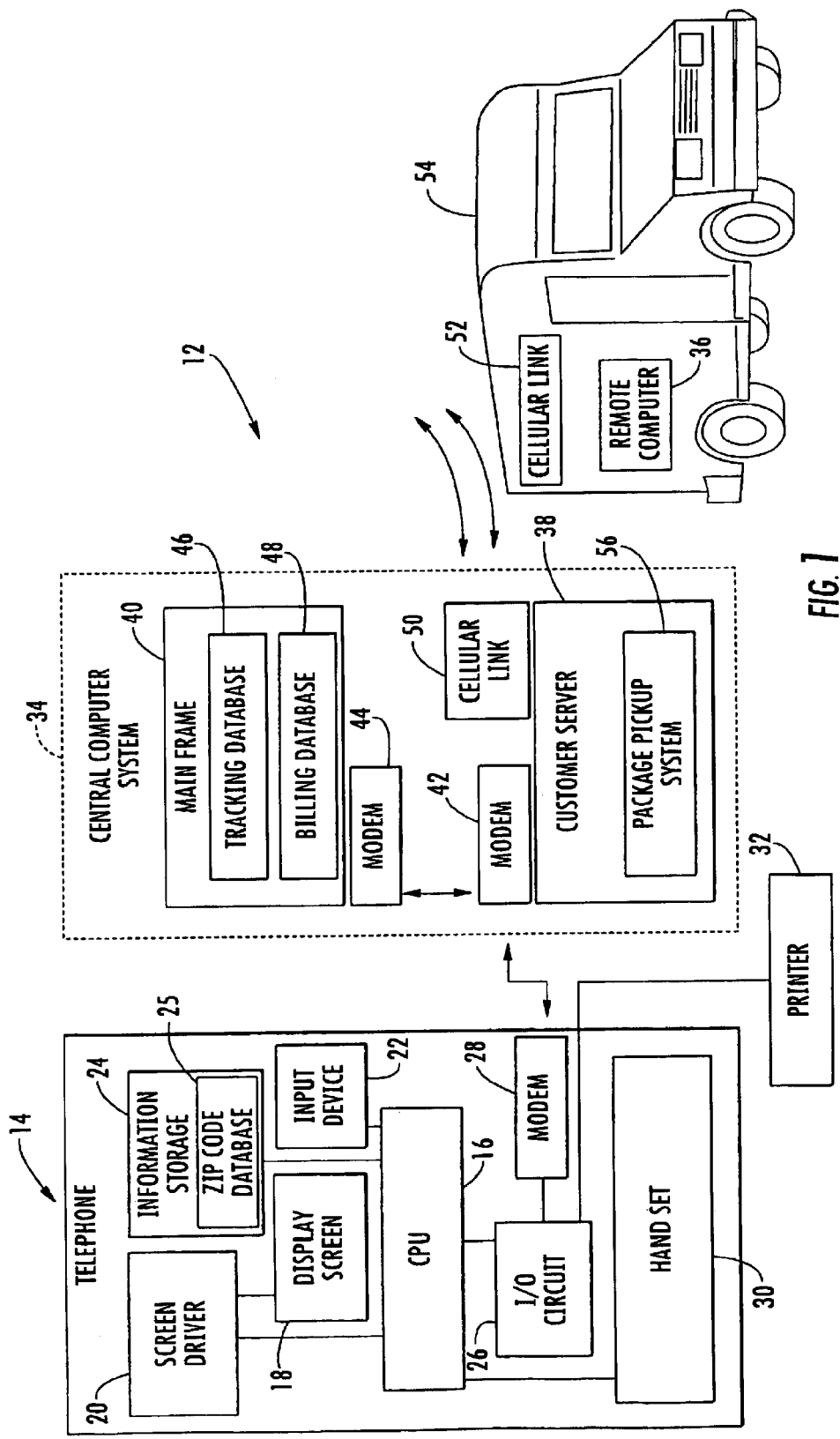
FIG. 1 is a block diagram of a system for preparing an electronic shipping record of a parcel in accordance with the preferred embodiment of the present invention.

Referring to the drawings, in which like numerals refer to like parts throughout the several views, FIG. 1 shows the components of a system 12 for preparing an electronic shipping record of a parcel. As used herein, the term "parcel" means any item handled by delivery services, such as packages, letters, containers, or unpackaged items.

The system 12 includes an intelligent telephone 14, of the type known as a smart phone. The smart phone 14 includes a processor or CPU 16 that is typically implemented as a microprocessor. The processor 16 is operative to control various devices within the smart phone 14 to retrieve, process, store, and display data. A preferred smart phone 14 for use in connection with the present invention is model P100A manufactured by Philips, Burlington, Mass.

A display screen 18 is connected to the processor 16 via a screen driver circuit 20, which operates the input and display functions of the display screen. In the preferred embodiment, the display screen 18 uses an LCD display. However, as will be understood by those skilled in the art, other types of displays, such as a CRT display, may be used in conjunction with the present invention.

The processor 16 is connected to an input device 22. In the preferred embodiment, the input device 22 includes a set of programmable keys, an alphabet keyboard, and a numeric keypad. The functions of the programmable keys are predefined, but may be varied depending on the mode of operation of the smart phone 14. The current functions of the programmable keys are displayed along a portion of the display screen 18. Accordingly, only a limited number of programmable keys, taking up limited space, need be provided with the smart phone 14.

Alternatively, the input device 22 may be associated with a display device to form a touch-sensitive data entry and display screen. Such a display screen is capable of interpreting handwriting and of defining button or key areas. For example, the screen may display a typewriter keyboard, a numeric keypad, or controls that cause certain operations to occur. For a touch-sensitive data entry and display screen, a stylus (not shown) is used in cooperation with the display screen for data entry. This is done by engaging a tip of the stylus against the display screen and touching controls defined by the screen or writing on the screen.

Additionally, it will be understood by those skilled in the art that data may be entered by other means, including audibly. Furthermore, textual instructions and statements presented to the user on the display screen 18 may be audibly announced using voice wave files and a voice chip built into the smart phone 14.

The processor 16 is also connected to an information storage device 24, which may be RAM (protected by a battery back up), a removable memory card, or other memory capable for use with a smart phone. In the preferred embodiment, the information storage device 24 is a 128 K Flash RAM device capable of storing system parameters, phone numbers, addresses, and a shipping procedure for preparing a shipping record of a parcel and for tracking the parcel. Additionally, the information storage device 24 includes a zip code database 25 for validating zip codes of parcels prepared for shipment in accordance with the preferred embodiment of the present invention.

An input/output (I/O) circuit 26 is connected to the processor 16 and controls communications between the smart phone 14 and other devices through a data transfer device. The preferred data transfer device is a modem 28, which can access a computer network via normal and cellular telephone lines. The modem 28 is a known device for communication between devices that are remote to one another and will not be further described herein.

The input/output (I/O) circuit 26 is also connected to a printer 32. A preferred printer 32 for use in connection with the present invention is model SII manufactured by Seiko Instruments, which is a low cost bit map label printer.

The smart phone 14 further includes an integrated handset 30 and associated features for normal telephone operation. Use of the smart phone 14 for preparing a parcel shipping record is preferred because it provides a unique combination of a familiar telephone supplemented with a display screen. Accordingly, the smart phone 14 is non-threatening to computer novices, who may be intimidated by a personal computer system or a computer terminal.

The smart phone 14 is also preferred because it includes an integrated modem, input device, and data transfer device necessary for accessing a computer system of a parcel delivery company. Moreover, the smart phone 14 is relatively inexpensive and can be installed by connection to a normal telephone line.

In the preferred embodiment, the system 12 includes a central computer system 34 and a remote computer 36 of a parcel delivery company. The central computer system 34 includes a customer server 38, which provides an interface with the smart phone 14, and a main frame 40. The customer server 38 and the main frame 40 are connected to one another via normal or cellular telephone lines using a modem 42 of the customer server and a modem 44 of the main frame.

The central computer system 34 communicates with the smart phone 14 via normal or cellular telephone lines using the modem 42 of the customer server 38 and the modem 28 of the smart phone. Shipping records generated with the smart phone 14 are uploaded to the customer server 38 and relayed to the main frame 40 for updating a tracking database 46 and a billing database 48.

The tracking database 46 stores a plurality of shipping records of parcels and the status of the parcels. The billing database 48 stores billing records associated with shipping the parcels. The billing records are determined from the shipping records.

The remote computer 36 maybe mounted in a parcel car 54 to notify a driver that a parcel is ready for shipment. When a shipping record is received from the smart phone 14, the customer server 38 sets a flag in a parcel pickup system 56 to indicate that a parcel is ready for shipment. The parcel pickup system 56 relays that information to the remote computer via cellular telephone lines using a cellular link 50 of the customer server 38 and a cellular link 52 of the remote computer.

Figure 2:
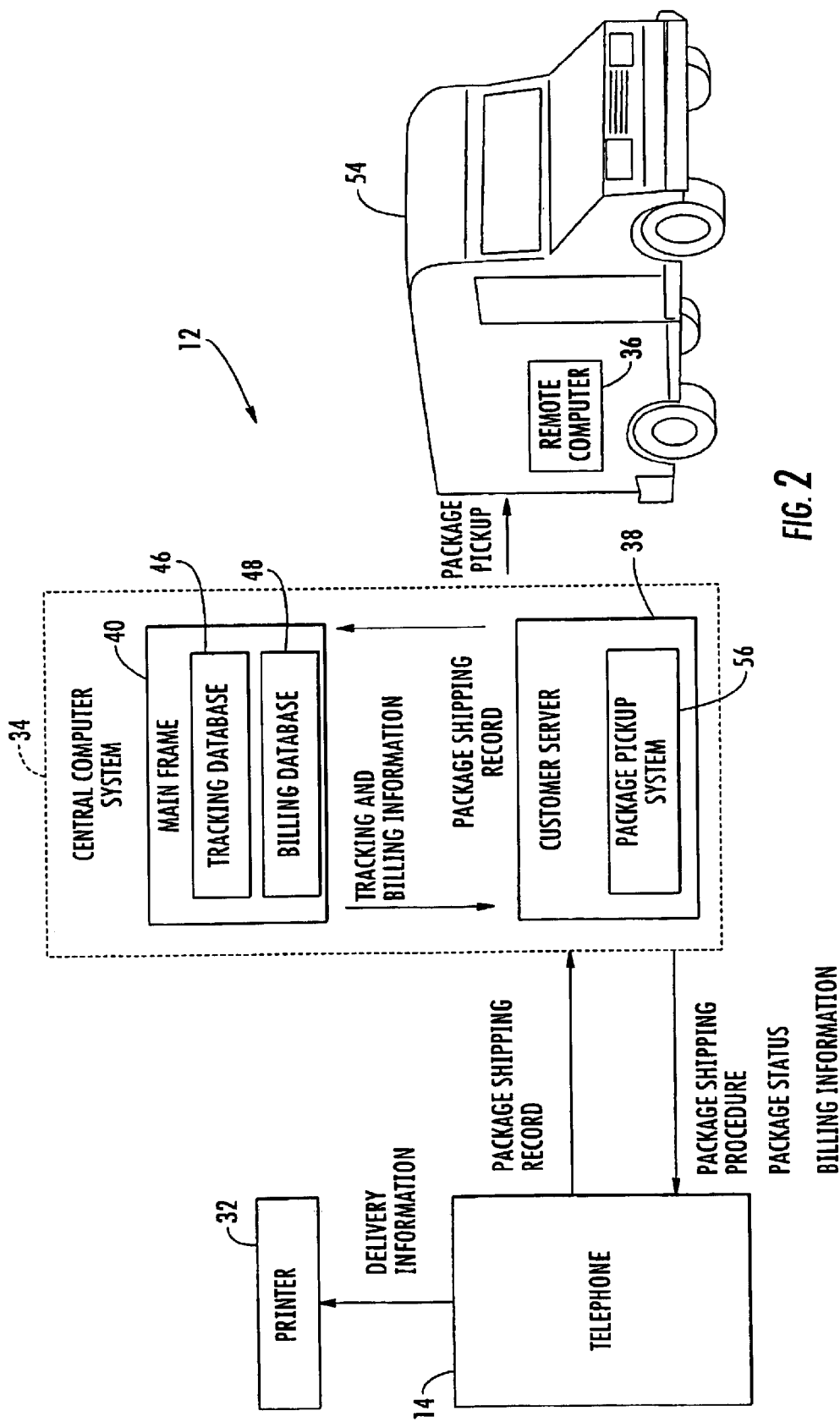
FIG. 2 is a diagrammatic view showing the information transmitted between the components of the system of FIG. 1 in accordance with the preferred embodiment of the present invention.

An overview of the information transmitted between the components of the system 12 for preparing an electronic shipping record of a parcel is shown by FIG. 2. A parcel shipping procedure is stored in the customer server 38 and downloaded to the smart phone 14 when the phone is first installed and when the procedure has been modified since the last downloading operation. Such downloading is automatic and takes place behind the scenes without intervention on the part of a customer using the smart phone 14.

The parcel shipping procedure is received by the smart phone 14 and stored to the information storage device 24. Using the parcel shipping procedure, a customer prepares a parcel shipping record by entering selections from a series of menus displayed on the screen 18. In the preferred embodiment, non-selectable features of the parcel shipping procedure are disabled and displayed in a dimmed style to indicate the same. Also, context based help is displayed upon request.

The customer selects a recipient, a service level, and additional services wanted for a parcel, each of which is displayed on the screen as a menu of choices for selection. These selections comprise delivery information for the parcel and are stored as part of a shipping record of the parcel.

Upon completion of the shipping record, the delivery information is relayed to the printer 32 in bit map form for printing of a label for affixation to the parcel. Preferably, the label is machine readable so that the parcel is machine sortable.

After printing is finished, the shipping record is transmitted to the customer server 38 of the central computer system 34. The customer server 38 relays the shipping record to the main frame 40 to update the tracking database 46 and the billing database 48. Additionally, the customer server 38 sets a flag in the parcel pickup system 56, which relays to the remote computer 36 that the parcel is ready for shipment. In this way, a driver is automatically notified of parcels that need to be shipped.

Using the smart phone 14, a customer can access the tracking database 46 and the billing database 48 to obtain wanted information. Requests for such information are uploaded to the customer server 38 and relayed to the main frame 40. The wanted information is then downloaded to the customer server 38 and relayed to the smart phone 14.

Figure 3:
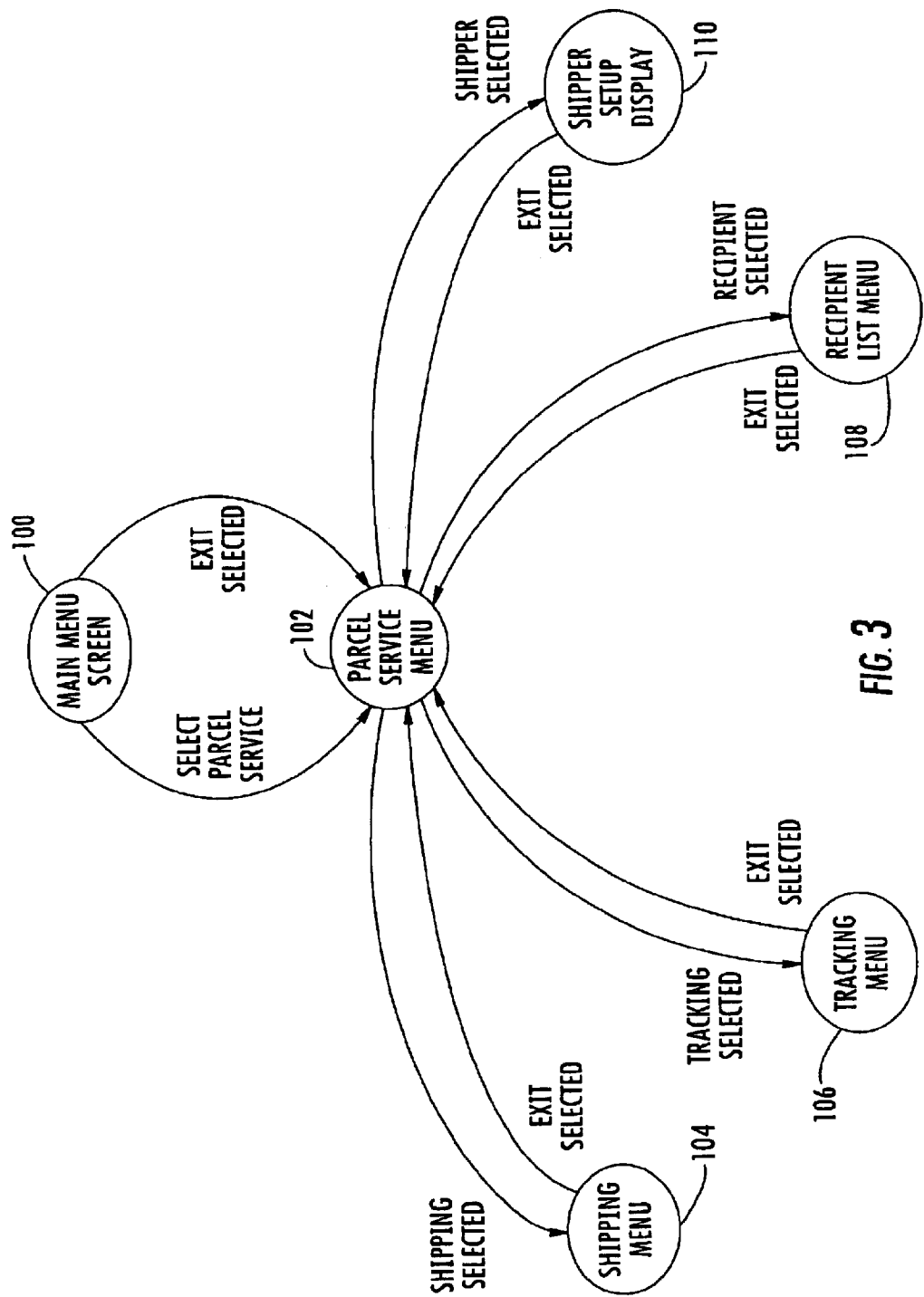
FIG. 3 is a state diagram showing the states for displaying a shipping menu and a tracking menu in accordance with the preferred embodiment of the present invention.

The method of the present invention for preparing an electronic record for shipping a parcel will now be described. FIG. 3 is a state diagram showing the states for displaying a shipping and a tracking menu, and for configuring recipient and shipper information in accordance with the preferred embodiment of the present invention. Screen displays of the user process are shown by FIGS. 4A–4F.

When the smart phone 14 is activated, the process displays a main menu screen at state 100 from which a customer may select the parcel service menu. In the preferred embodiment, the parcel service is "UNITED PARCEL SERVICE," the assignee herein. The main menu is shown by the screen display of FIG. 4A.

Figure 4A:
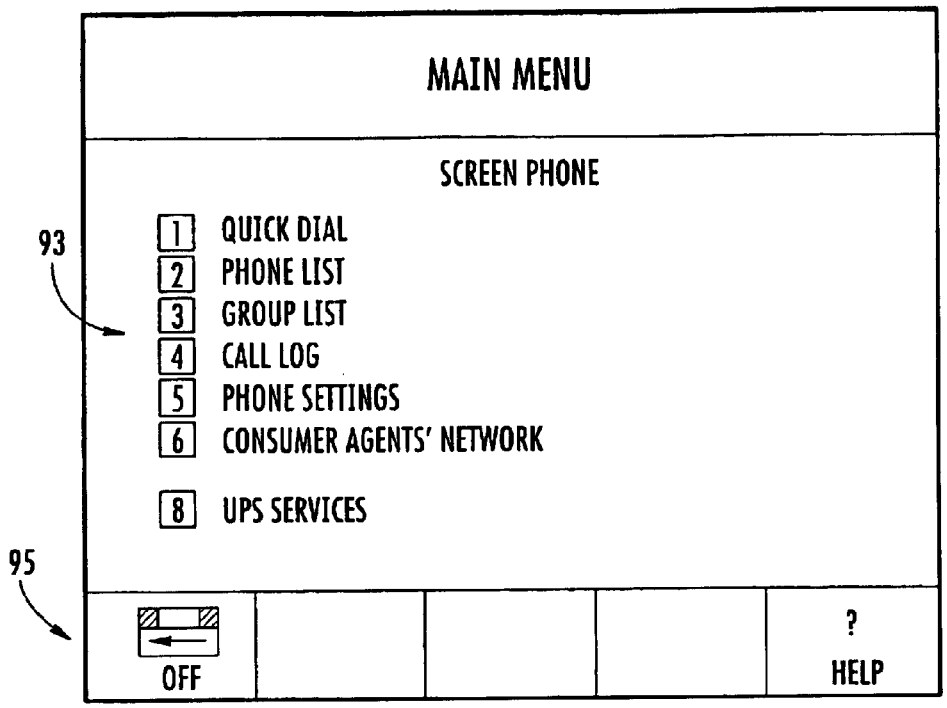

As shown by FIG. 4A, selections 93 of the main menu, and of other menus, are displayed in the center of the display screen 18. A selection is made from a menu by choosing on the numerical keypad the number associated with the selection. As further shown by FIG. 4A, functions of the programmable keys 95 for the main menu screen, and for other screens, are displayed along a bottom portion of the display screen 18. A function is selected from a screen display by choosing the programmable key associated with that function.

To prepare a parcel for shipment or to track a parcel, the customer selects parcel service from the main menu. Upon the parcel service selection, the parcel service branch of state 100 leads to state 102 where a parcel service menu is displayed. The parcel service menu is shown by the screen display of FIG. 4B.

Figure 4B:
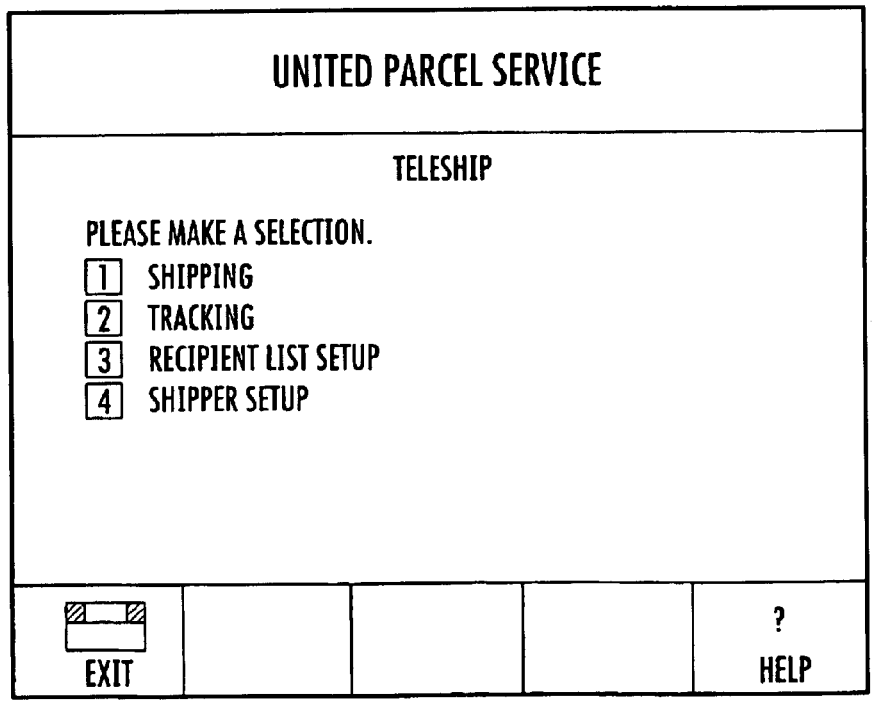

As shown by FIG. 4B, the customer may select shipping services, tracking services, recipient list setup, or shipper setup from the parcel service menu. The customer may also choose "exit" in which case the exit branch of state 102 returns to state 100 where the main menu is displayed. In all other cases, the exit branch of a state returns to state 102, where the parcel service menu is displayed. Additionally, the customer may choose help at any time to receive information relevant to the current screen.

Figure 4C:
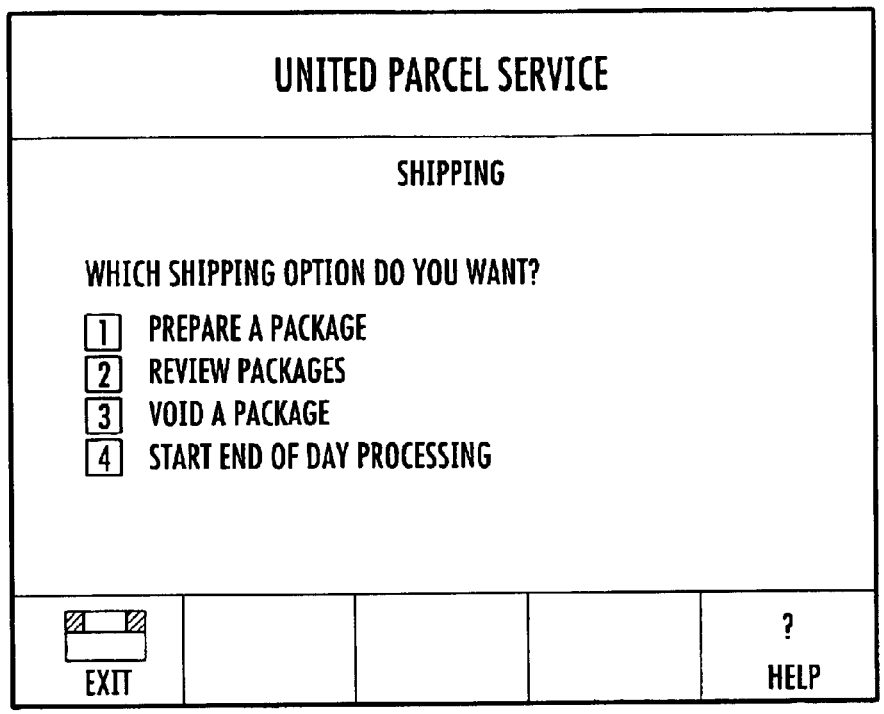

To prepare a parcel for shipment, the customer selects shipping from the parcel service menu. In response to a shipping selection, the shipping branch of state 102 leads to state 104 where a shipping menu is displayed. The shipping menu is shown by the screen display of FIG. 4C. From the shipping menu, as shown by FIG. 4C, the customer may select to prepare a parcel for shipment, to review a parcel prepared for shipment, to void a parcel prepared for shipment, or to start end of day processing.

Figure 4D:
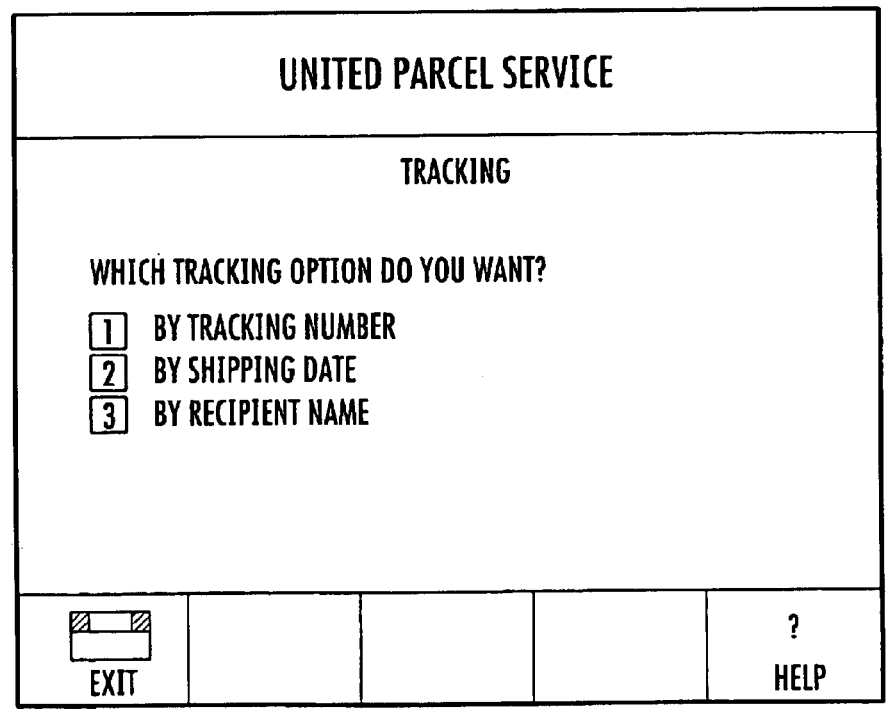

To track a parcel, the customer selects tracking from the parcel service menu. In response to a tracking selection, the tracking branch of state 102 leads to state 106 where a tracking menu is displayed. The tracking menu is shown by the screen display of FIG. 4D. From the tracking menu, as shown by FIG. 4D, the customer may select to track a parcel by number, by date, or by recipient.

To add, delete or modify information associated with a recipient, the customer selects recipient list setup from the parcel service menu. In response to a recipient selection, the recipient branch of state 102 leads to state 108 where the recipient list is displayed as a menu of choices for selection. The recipient list menu is shown by the screen display of FIG. 4E. From the recipient list, the customer may select to review a recipient. A customer may also, as is described below in more detail, search and sort the recipient list. By choosing the go back function, the customer may further, as in all cases, return to the previous screen.

To configure the shipper settings of the smart phone 14, the customer selects shipper setup from the parcel service menu. In response to a shipper setup selection, the shipper branch of state 102 leads to state 110 where a screen is displayed for entering information about the customer. In the preferred embodiment, the shipper information is included as part of a parcel shipping record so that the parcel can be associated with, and billed to the customer. The shipper entry screen is shown by the screen display of FIG. 4F. From the shipper entry screen, as shown by FIG. 4F, the customer may choose to clear or modify the current information. When the customer has completed any necessary modifications, the process stores the updated shipper setup to the information storage device 24. From state 110, the customer may exit to the parcel service menu.

Figure 5A:
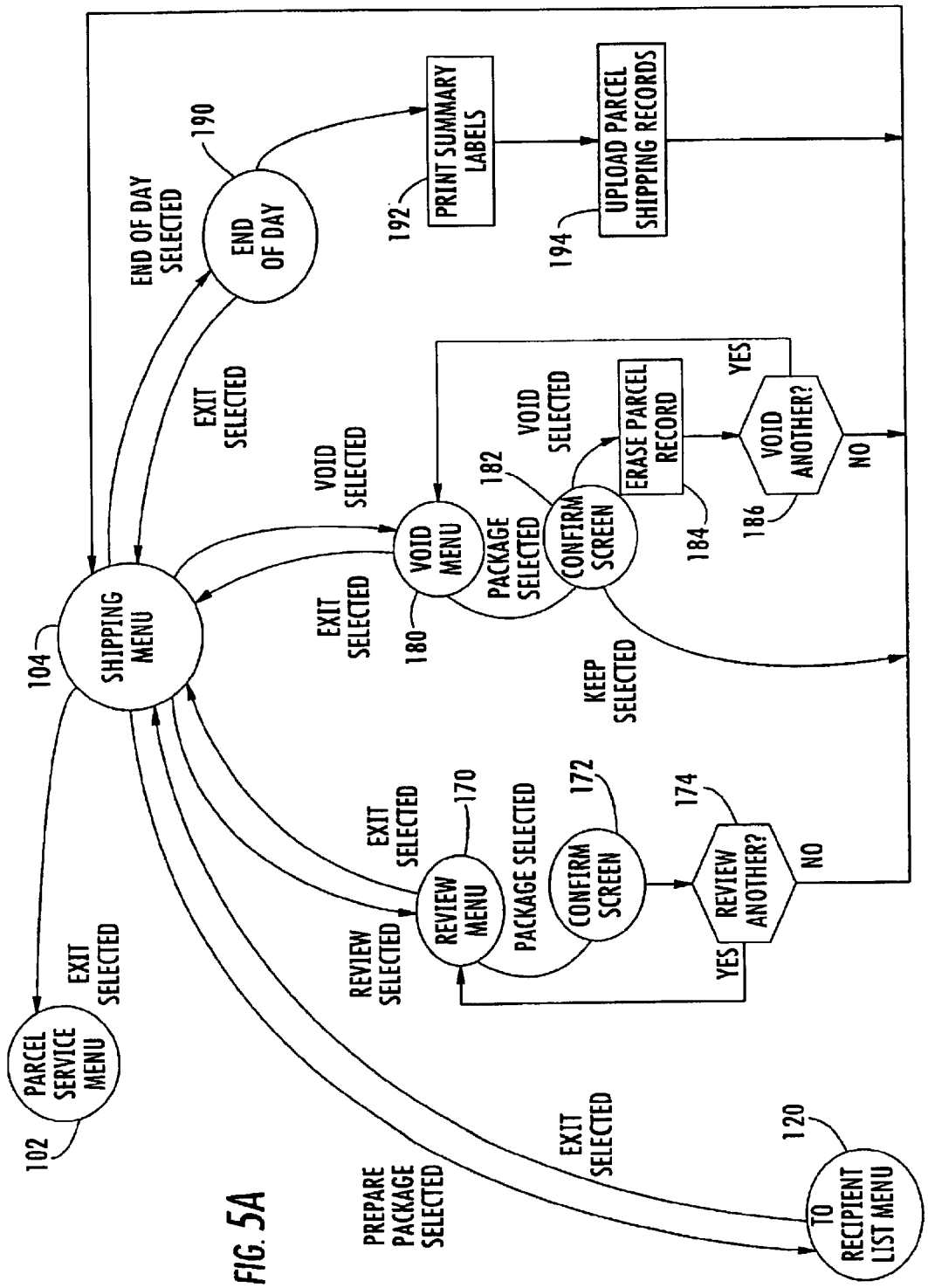
FIGS. 5A–5B are logical flow diagrams showing the sequence of steps for preparing a shipping record of a parcel with the intelligent telephone of the present invention.
Figure 5B:
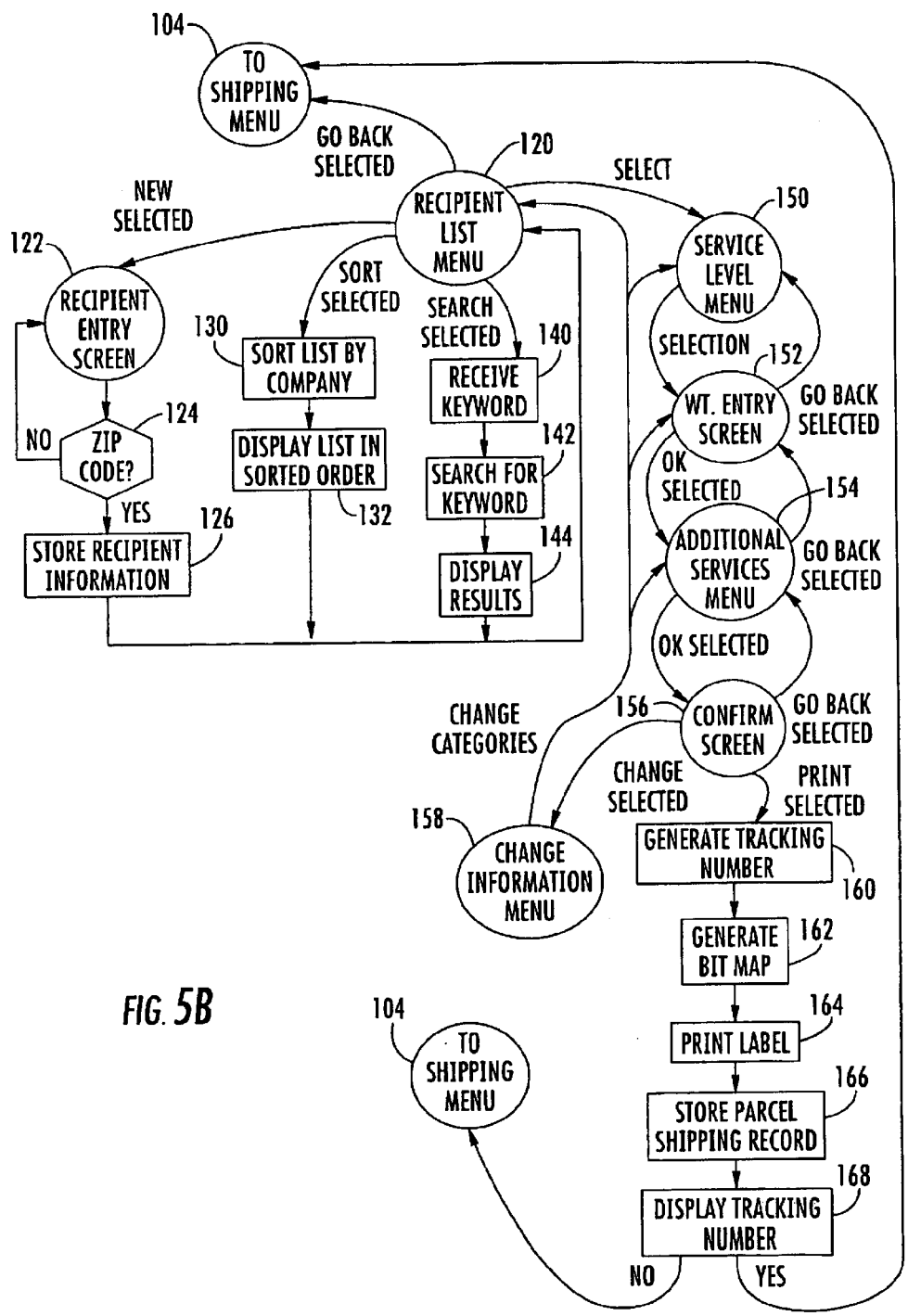
Figure 6C:
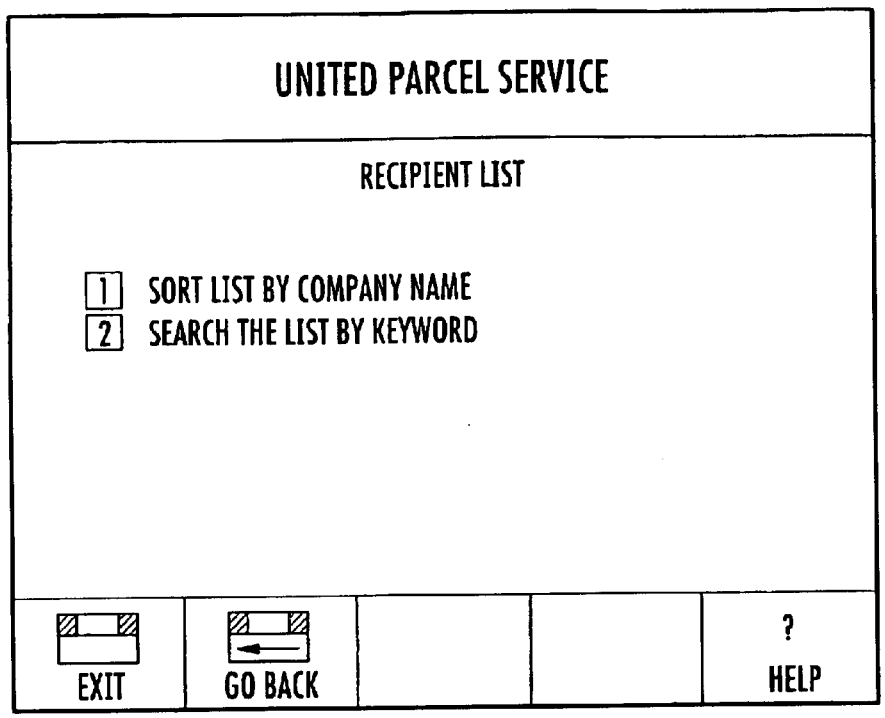
FIGS. 6A–6Q are a sequence of screen displays from the user's perspective showing the process of preparing a shipping record of a parcel with the intelligent telephone of the present invention in accordance with the preferred embodiment.
Figure 6D:
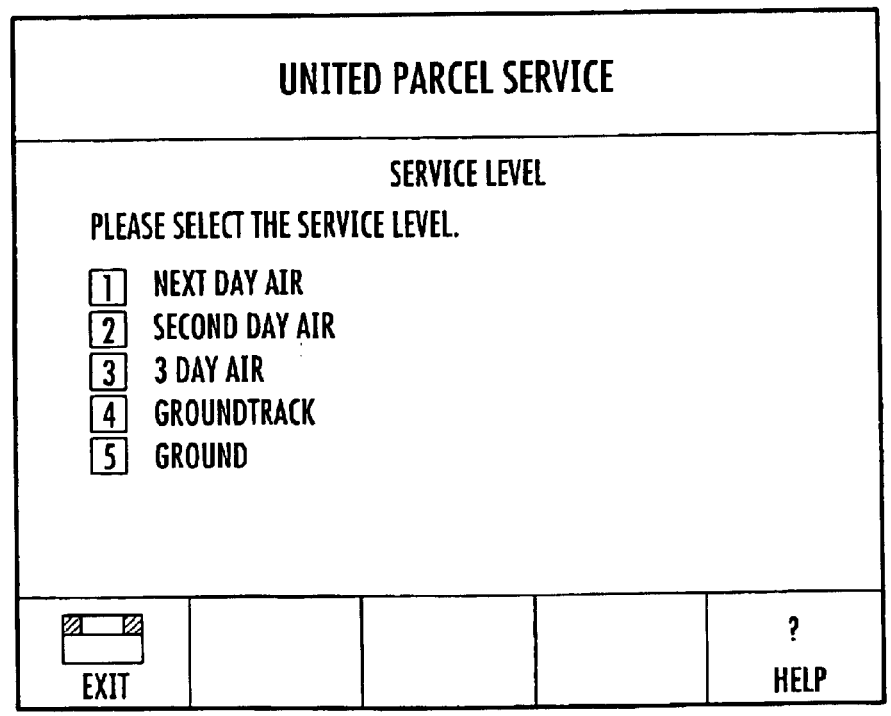
Figure 6E:
Figure 6F:
Figure 6G:
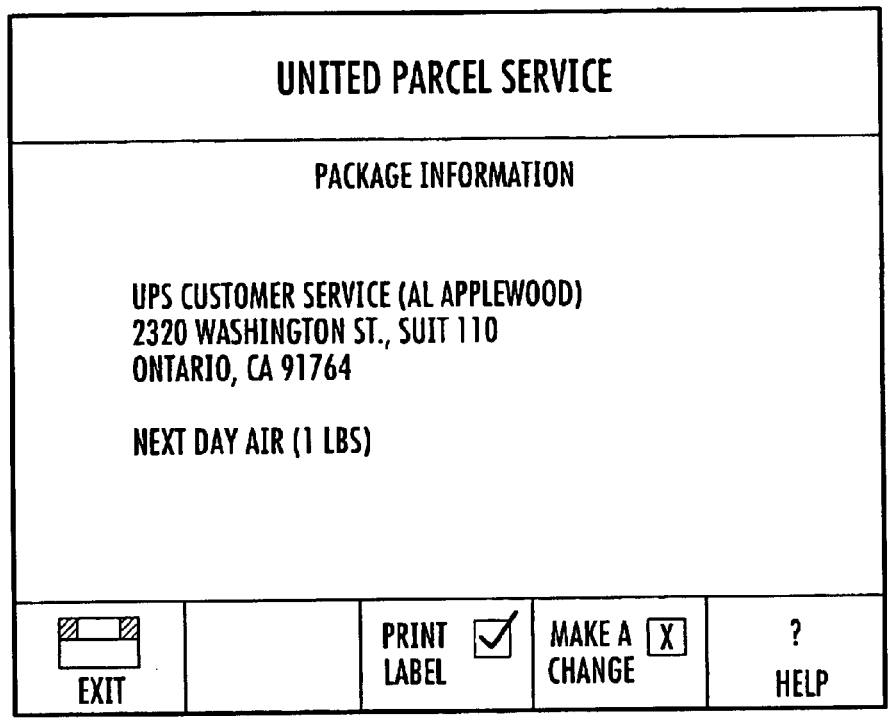
Figure 6H:
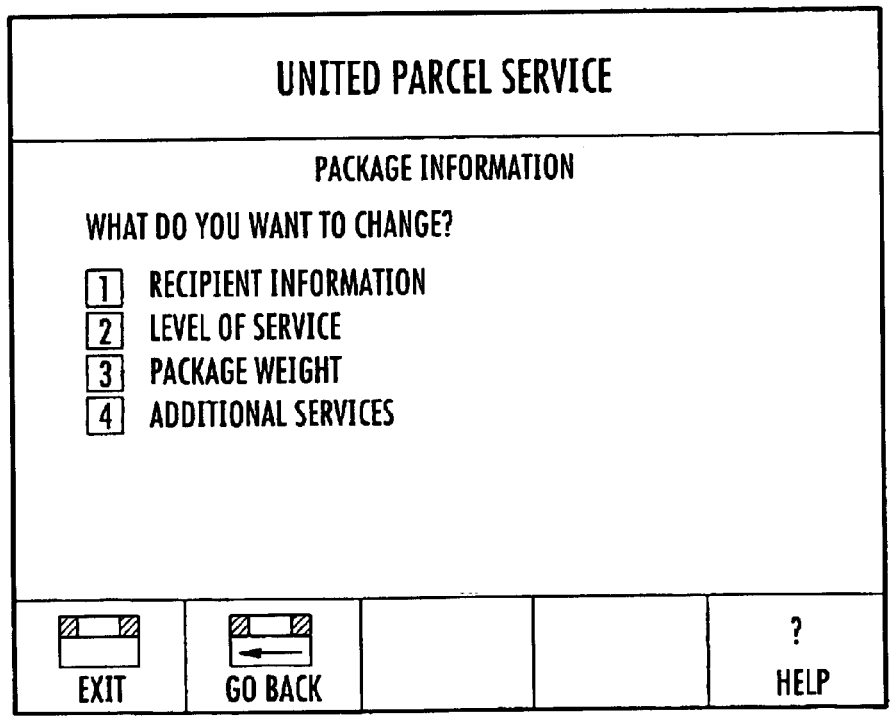
Figure 6I:
Figure 6J:
Figure 6M:
Figure 6N:
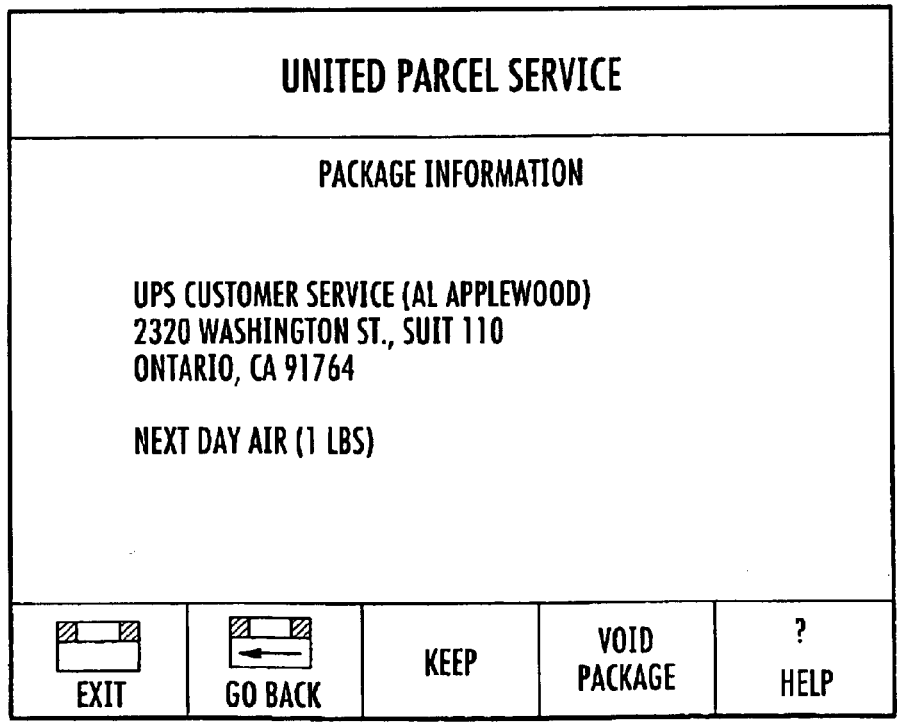
Figure 6O:
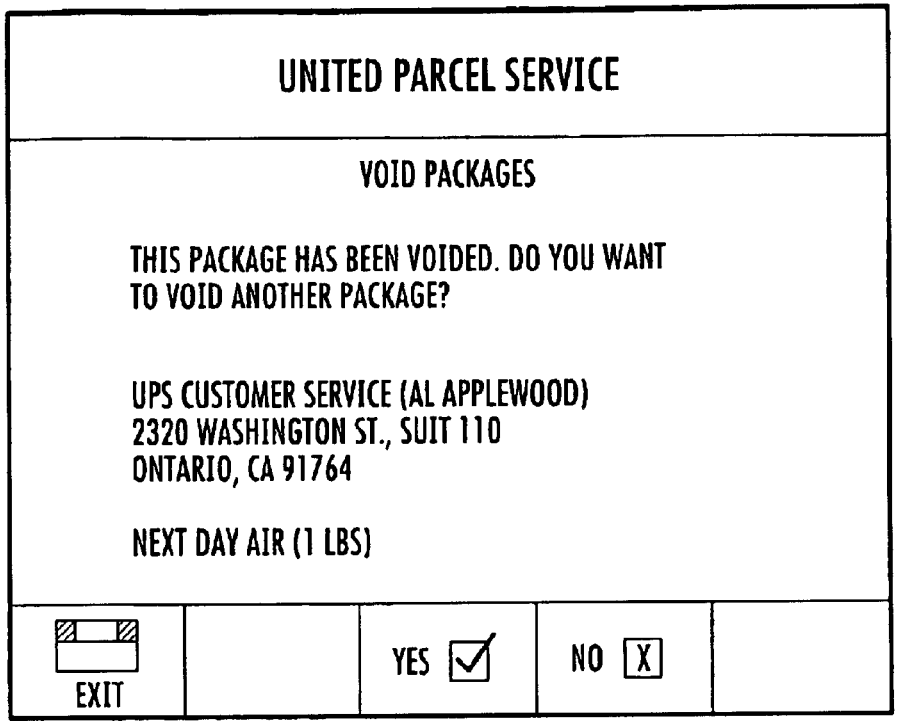
Figure 6P:
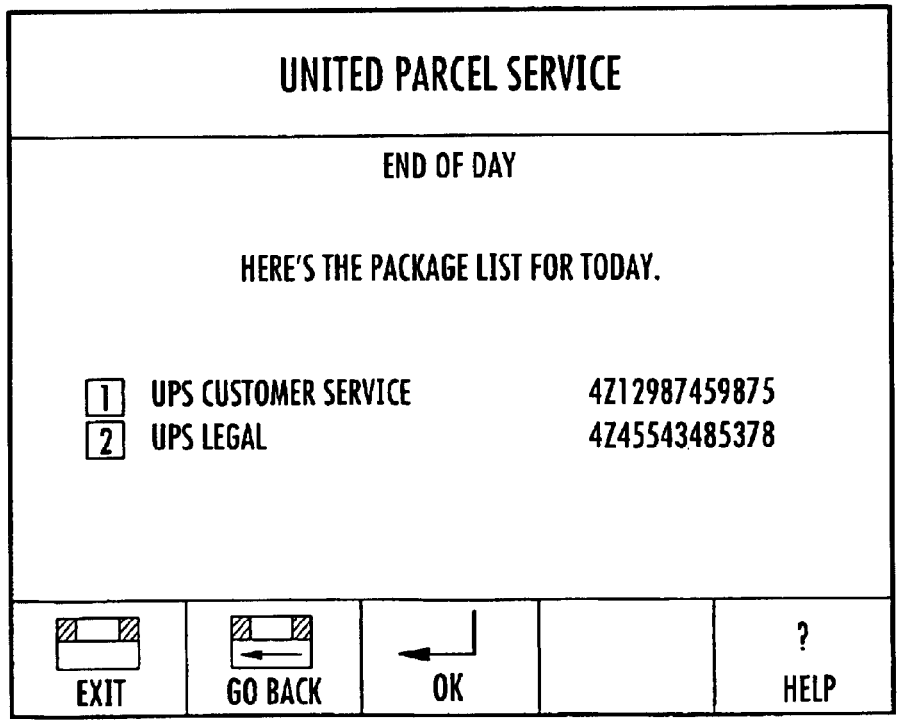
Figure 6Q:
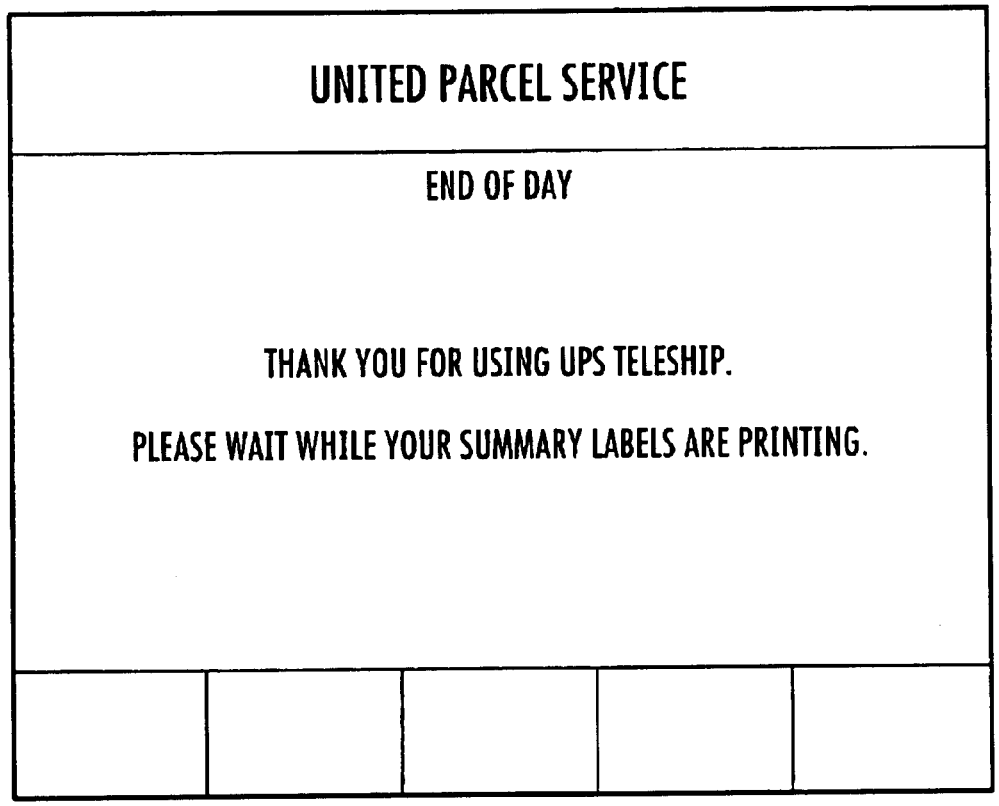

FIGS. 5A–5B are logical flow diagrams showing the procedure for preparing a parcel shipping record in accordance with the preferred embodiment of the present invention. Screen displays of the user process are shown by FIGS. 6A–6Q.

From the shipping menu at state 104, as previously discussed in connection with FIG. 4C, the customer may select to prepare a parcel for shipment, to review a parcel prepared for shipment, to void a parcel prepared for shipment, or to start end of day processing. If the customer selects to prepare a parcel for shipment, the parcel preparation branch of state 106 leads to state 120 where a list of recipients is displayed as a menu of choices for selection. In the preferred embodiment, the recipient list is initially displayed alphabetically, but may be manipulated by the customer. The recipient list menu is shown by the screen display of FIG. 6A.

If the recipient to whom the parcel is to be shipped is not included in the list, the customer may add that recipient to the list by selecting the new recipient function. If the recipient is included in the list, but cannot be easily found, the customer may sort the recipient list by company name or search the list by keyword.

To add a new recipient to the list, the customer selects the new recipient function. Upon receipt of that selection, the new recipient branch of state 120 leads to state 122 where a screen is displayed for entering information for a new recipient. The recipient entry screen is shown by the screen display of FIG. 6B. The customer enters information for the new recipient and then selects the "OK" function. Upon receipt of that function, the OK branch of state 122 leads to step decisional 124 where the zip code is validated.

The zip code is validated by comparing it with the zip code database 25 to determine if the zip code is proper for the state that was entered therewith. If the zip code is invalid, the NO branch of decisional step 124 returns to state 122 where the customer may modify the zip code and repeat the validation process. If the zip code is valid, the YES branch of decisional step 124 proceeds to step 126 where the delivery information of the new recipient is stored to the information storage device 24. Step 126 returns to state 120 where the recipient list menu is displayed and the customer may select the new recipient.

To find a recipient included in the recipient list, the customer may sort the list by company name or search the list by keyword. Choosing the options function from the recipient list menu shown if FIG. 6A displays the screen of FIG. 6C for sorting and searching the recipient list.

To sort the recipient list by company name, the customer chooses the sort selection at state 120. The sort branch of state 120 leads to step 130 where the list is sorted. Proceeding to step 132, the recipient list is displayed in that sorted order. Step 132 returns to state 120 so that the customer can select a recipient from the sorted list.

To search the recipient list by keyword, the customer chooses the search selection at state 120. The search branch of state 120 leads to step 140 where a keyword is received from the customer. Next, at step 142, the recipient list is searched for the keyword. Proceeding to step 144, the recipients fitting the search criteria are displayed as the recipient list. Step 144 returns to state 120 so that the customer can select the recipient form the list generated by the search.

From the recipient list, whether the list is in the default alphabetical order, a sorted-by-company order, or comprises the results of a search, the customer selects the recipient to whom the parcel is to be shipped at state 120. Upon receipt of a selection, the process proceeds to state 150 where the different levels of shipping service are displayed as a menu of choices for selection. The service level menu is shown by the screen display of FIG. 6D. From the service level menu, the customer selects the desired level of service by choosing the number associated with that level of service. Thus, of example, the customer selects "NEXT DAY AIR" service by choosing the number one (1) from the service level menu.

Upon receipt of a service level, the process proceeds to state 152 where a screen for entering the weight of the parcel is displayed. The weight entry screen is shown by the screen display of FIG. 6E. The customer enters the weight of the parcel and then selects the OK function. After receipt of that function, the process proceeds to state 154 where additional services are displayed as a menu of choices for selection. The additional services menu is shown by the screen display of FIG. 6F. From the additional services menu, the customer selects the additional services desired and then selects the OK function.

Upon receipt of that function, the process proceeds to state 156 where a confirmation screen is displayed showing the information selected for the parcel. The confirmation screen is shown by the screen display of FIG. 6G. From the confirmation screen, the customer may choose to change the entered information or, if it is correct, to proceed with printing a label for the parcel.

To change the information, the customer selects the change function from the confirmation screen. The change branch of state 156 leads to state 158 where the categories of recipient information, level of service, package weight, and additional services are displayed as a menu of choices for selection. The change menu is shown by the screen display of FIG. 6H. From the change menu, the customer selects the category of information that is to be changed.

Upon such a selection, the process returns to the appropriate state the selected category. Thus, selection of recipient information causes the process to return to the recipient list menu at state 120, from where another recipient may be selected. Selection of the level a service category causes the process to return to the level of service menu at state 150, from where a new level of service may be selected. Selection of the parcel weight category causes the process to return to the weight entry screen at state 152, from where a different weight may be entered. Selection of the additional services category causes the process to return to the additional services menu at state 154, from where new or different additional services may be selected.

When the customer is satisfied with the parcel information, he or she proceeds with the parcel preparation process by selecting the print label function from the parcel confirmation screen of state 156. The print branch of state 156 leads to step 160 where an identification number is generated. In the preferred embodiment, the identification number is a unique number that can be used to track the parcel.

Next, at step 162, a bit map is generated for printing a shipping label. The step of generating a bit map allows an inexpensive printer to be used in accordance with the preferred embodiment of the present invention. Step 162 leads to step 164 where a label is printed from the bit map.

The label, as shown by FIGS. 7A–7B, comprises two parts. The first part, shown by FIG. 7A, prominently displays the recipients address in alphanumeric and machine readable format. The second part, shown by FIG. 7B, prominently displays the tracking number in alphanumeric and machine readable format. Accordingly, the parcel will be machine sortable in accordance with the preferred embodiment of the present invention.

Proceeding to state 166, a shipping record of the parcel is stored to the information storage device 24. In the preferred embodiment, the parcel shipping record includes the recipient information, the level of service information, the weight information, and the additional services that were selected by the customer. Additionally the preferred parcel shipping record includes the tracking number and customer's shipper information, which is discussed below in more detail.

Proceeding to state 168, the tracking number is displayed and the customer queried whether he or she wants to prepare another parcel for shipment. The screen display for querying the customer is shown by FIG. 6I. If the customer chooses to prepare another parcel for shipment, the YES branch of state 168 returns to state 120 where the recipient list is displayed. If the customer chooses not to prepare another parcel for shipment, the NO branch of state 168 returns to the shipping menu of state 104 where other shipping operations may be selected.

From the shipping menu at state 104, the customer may further choose to review the parcels of the day, to void a parcel, or to begin End of Day processing. If the customer chooses to review a parcel from the shipping menu, the review branch of state 104 leads to state 170 where a list of the day's parcels is displayed as a menu of choices for selection. The parcel review menu is shown by the screen display of FIG. 6J. To review a parcel, the customer selects that parcel by choosing the number associated with the parcel. Upon receipt of a selection, the selection branch of state 170 leads to state 172 where the confirmation screen is displayed showing the information selected for the parcel. The parcel confirmation screen for reviewing a parcel is shown by FIG. 6K.

State 172 leads to step 174 where the customer is queried whether he or she wants to review another parcel. The screen display for step 174 is shown by FIG. 6L. If the customer chooses to review another parcel, the YES branch of step 174 returns to state 170 where the list of the day's parcels is displayed as a menu of choices for selection. If the customer chooses not to review another parcel, the NO branch of step 174 returns to the shipping menu of state 104 where other shipping operations may be selected.

If the customer chooses to void a parcel from the shipping menu, the void branch of state 104 leads to state 180 where the list of that day's parcels is displayed as a menu of choices for selection. The parcel void menu is shown by the screen display of FIG. 6M. To review a parcel for the purposes of voiding it, the customer selects a parcel by choosing the number associated with that parcel. Upon receipt of a selection, the selection branch of state 180 leads to state 182 where the confirmation screen of the parcel is displayed. The parcel confirmation screen for voiding a parcel is shown by FIG. 6N.

From the parcel confirmation screen at state 182, the customer may choose either to void or keep the parcel. If the customer chooses to keep the parcel, state 182 returns to the shipping menu of state 104 where other shipping operations may be selected. If the customer chooses to void the parcel, state 182 leads to step 184 where the parcel shipping record is erased from the information storage device.

Step 184 proceeds to step 186 where the customer is queried whether he or she wants to void another parcel. The screen display for step 186 is shown by FIG. 6O. If the customer chooses to void another parcel, the YES branch of step 186 returns to state 180 where the list of the day's parcels is displayed as a menu of choices for selection. If the customer chooses not to void another parcel, the NO branch of step 186 returns to the shipping menu of state 104 where other shipping operations may be selected.

After all parcels of the day have been prepared, the customer chooses End of Day from the shipping menu at state 104. The End of Day branch of state 104 leads to state 190 where the parcels of the day are displayed. The display screen for state 190 is shown by FIG. 6P. To proceed, the customer selects the OK function. Upon receipt of that function, the process prints a parcel shipping summary at step 192. The parcel shipping summary is shown by FIG. 7C. The display screen during the printing process is shown by FIG. 6Q.

Step 192 leads to step 194 where the parcel shipping records of the day are uploaded to the customer server 38 of the central computer system 34. The customer server 38 relays the shipping records to the main frame 40 to update the tracking database 46 and the billing database 48. Accordingly, the packages can thereafter be tracked. Step 194 returns to the shipping menu of state 104.

Figure 8:
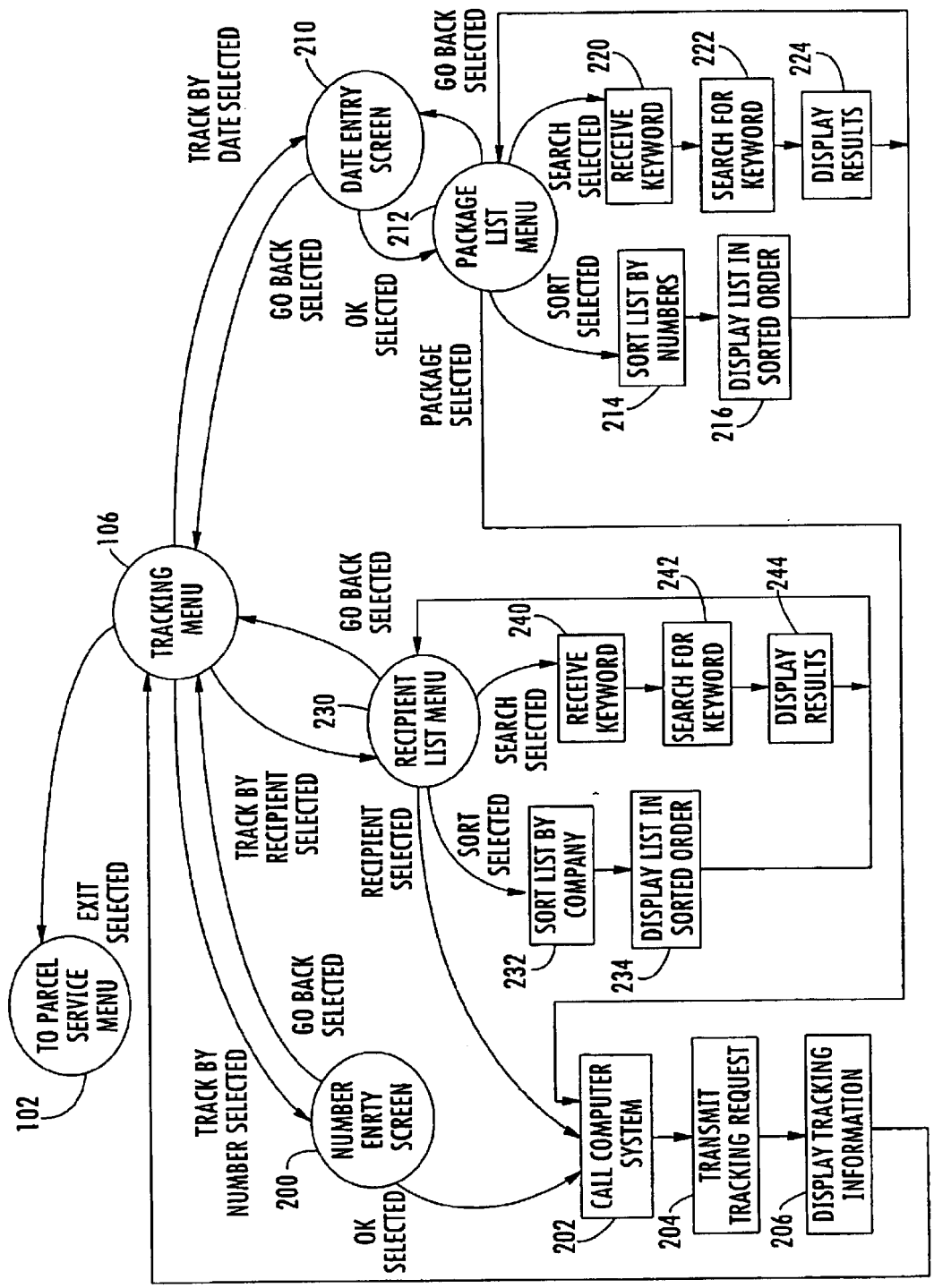
FIG. 8 is a logical flow diagram showing the sequence of steps for tracking a parcel with the intelligent telephone of the present invention in accordance with the preferred embodiment.

FIG. 8 is a logical flow diagram showing the process for tracking a parcel in accordance with the preferred embodiment of the present invention. Screen displays of the user process are shown by FIGS. 9A–9F.

From the tracking menu at state 106, as previously discussed in connection with FIG. 4D, the customer may select to track a parcel by number, by date, or by recipient. If the track by number choice is selected from the tracking menu, the track by number branch of state 106 leads to state 200 where a screen is displayed for entering a number. The number entry screen is shown by the screen display of FIG. 9A. The customer then enters the number of the parcel that is to be tracked and selects the "OK" function. Upon receipt of that function, the OK branch of state 200 leads to step 202.

Figure 9A:
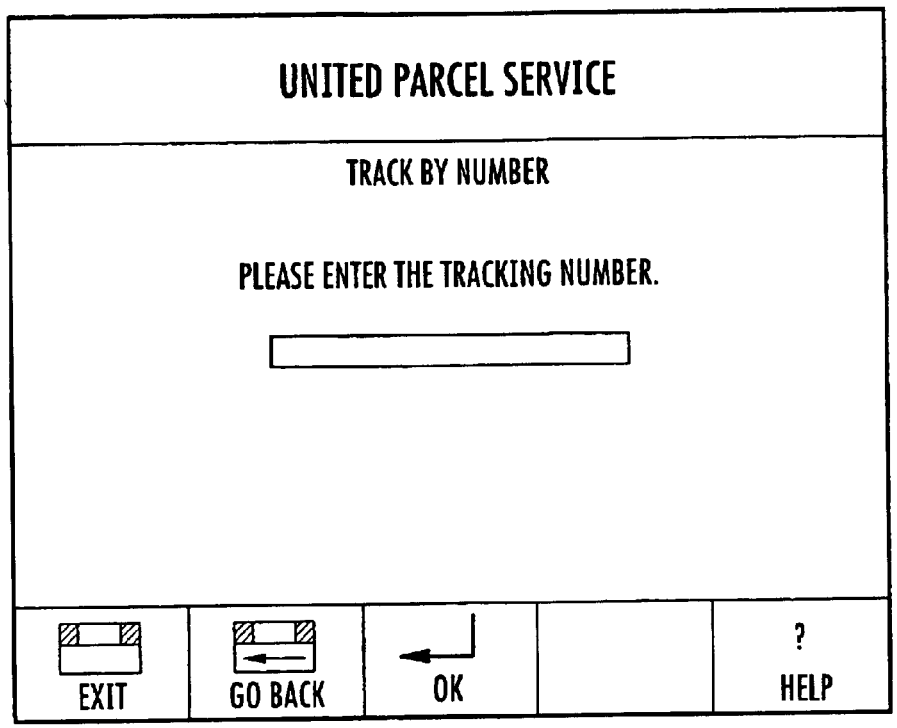
Figure 9B:
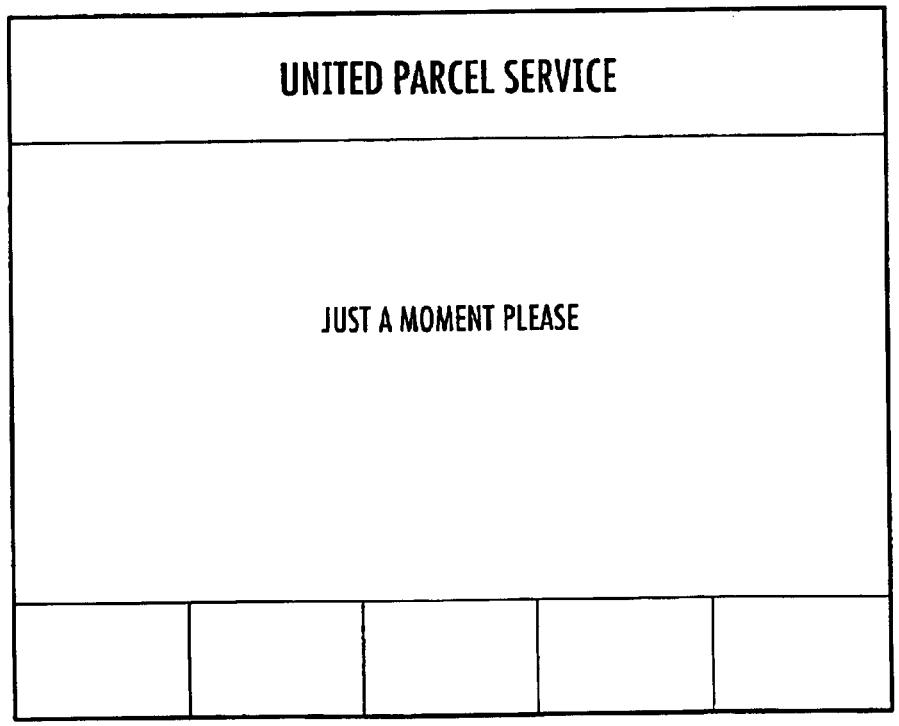

At step 202, the smart phone 14 calls the computer system 34 via telephone lines using the modem 28 of the smart phone and the modem 42 of the customer server 38. Next, at step 204, a request for tracking information is transmitted to the customer server 38. The customer server 38 relays the request to the main frame 40 via telephone lines using the modem 42 of the customer server 38 and the modem 44 of the main frame 40. The main frame 40 then accesses the tracking database 46, obtains the status of the parcel being tracked, and sends the status information to the customer server 38. The customer server 38, in turn, relays the status information to the smart phone 14. During this period the processing screen shown by FIG. 9B is displayed.

Figures 9C, 9D:

Proceeding to step 206, the status information is displayed to the customer. The parcel status screen is shown by the screen display of FIG. 9C. From the parcel status screen, as shown by FIG. 9C, the customer may determine whether the parcel has been delivered and, if so, by whom it was received and at what time.

Step 206 returns to the tracking menu at state 106. If the track by date choice is selected from the tracking menu, the track by date branch of state 106 leads to state 210 where a screen is displayed for entering a date. The date entry screen is shown by the screen display of FIG. 9D. The customer then enters the wanted date and selects the "OK" function. Upon receipt of that function, the OK branch of state 210 leads to state 212.

At state 212, a list of parcels shipped on the entered date is displayed as a menu of choices for selection. The list of parcels menu is shown by the screen display of FIG. 9E. If a parcel to be tracked is not visible in the display, the customer may sort the list of parcels by numbers or search the list for a keyword. Steps 214–216 for sorting the list and steps 220–224 for searching the list are similar to steps 130–132 and steps 140–144 of FIG. 5, respectively. Accordingly, they will not be separately described.

From the list of parcels screen of state 212, the customer selects the parcel that is to be tracked. Upon receipt of a selection, the process leads back to step 202, where, as previously discussed in connection with FIG. 9C, the smart phone 14 accesses the central computer system 34 to obtain the tracking status of the parcel.

Returning to the tracking menu at state 106, if the track by recipient choice is selected, the recipient branch of state 106 leads to state 230 where the list of recipients is displayed as a menu of choices for selection. The list of recipients menu is shown by the screen display of FIG. 9F. If the recipient of the parcel to be tracked is not visible in the display, the customer can sort the recipient list by company or search the list for a keyword. Steps 232–234 for sorting the list and steps 240–244 for searching the list are similar to steps 130–132 and steps 140–144 of FIG. 5, respectively. Accordingly, they will not be separately described.

From the list of recipients displayed at state 230, the customer selects the recipient of the parcel that is to be tracked. Upon receipt of a selection, the process leads back to step 202, where, as previously discussed in connection with FIG. 9C, the smart phone 14 accesses the central computer system 34 to obtain the tracking status of the parcel.

Figure 10:
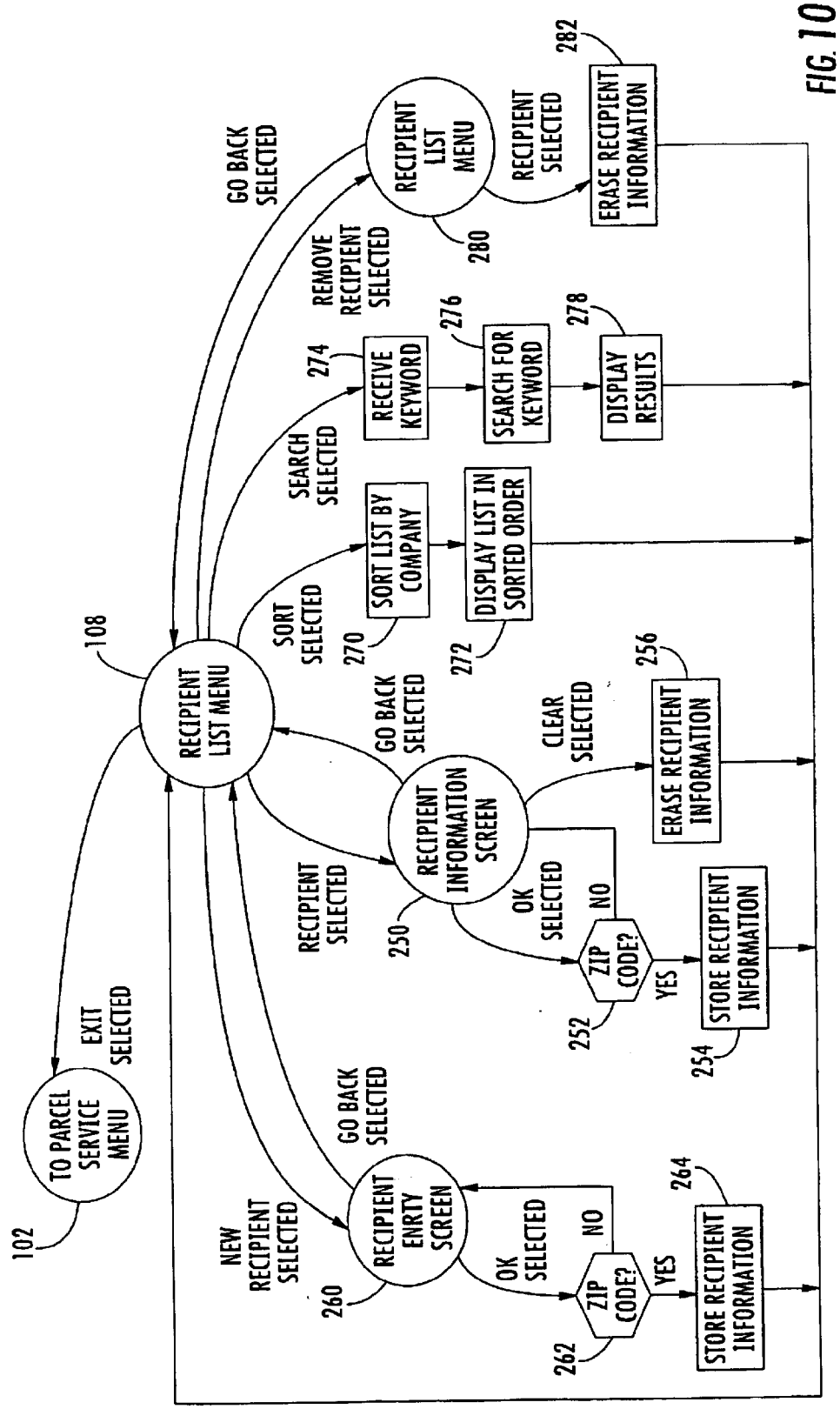
FIG. 10 is a logical flow diagram showing the sequence of steps for updating a recipient shipping list stored in the intelligent telephone of the present invention in accordance with the preferred embodiment.
Figure 11C:
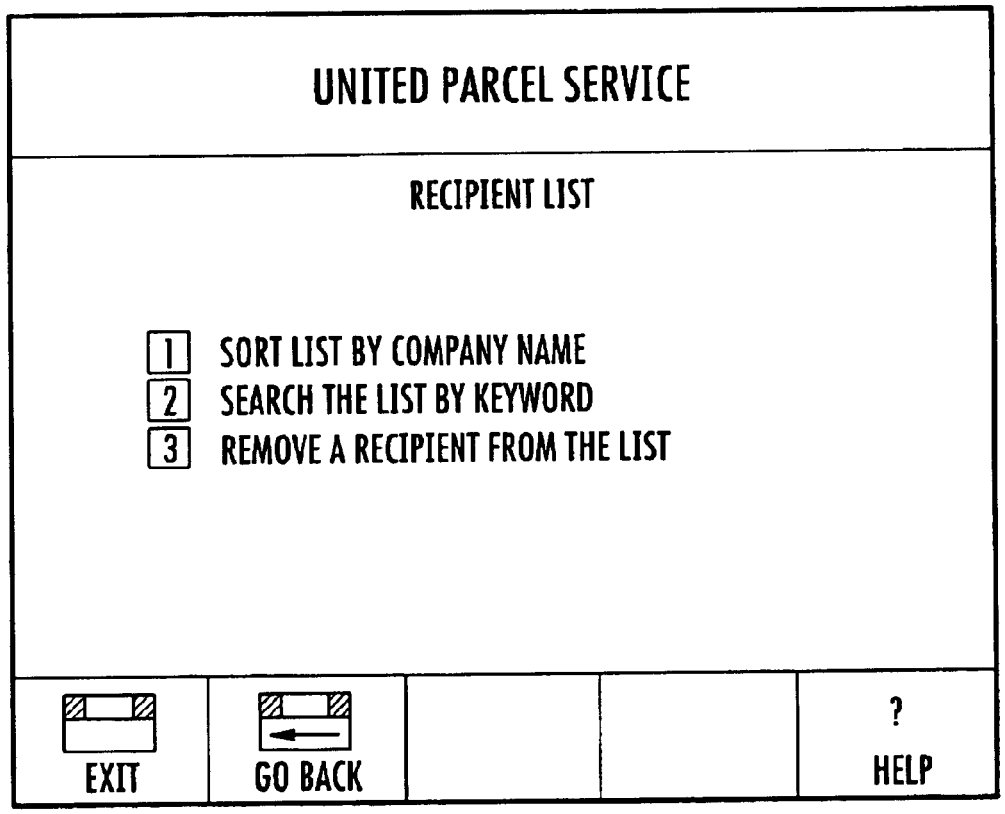

FIG. 10 is a logical flow diagram showing the process for updating a recipient list in accordance with the preferred embodiment of the present invention. Screen displays of the user process are shown by FIGS. 11A–11C.

From the recipient list menu at state 108, as previously discussed in connection with FIG. 4E, the customer may delete or modify the information for existing recipients, or add new recipients. If the information for a recipient needs to be updated, the customer selects the recipient from the recipient list menu. Upon selection of a recipient, the selection branch of state 108 leads to state 250 where that recipient's information is displayed in detail. The recipient information screen is shown by the screen display of FIG. 11A. With the screen displayed, the customer can modify the recipient's information as necessary. Afterward, the customer selects the "OK" function. Upon receipt of that function, the OK branch of state 250 leads to decisional step 252 where the zip code is validated.

As previously discussed in connection with FIGS. 5A–5B, the zip code is validated by comparing it with the zip code database 25 to determine if the zip code is proper for the state entered therewith. If the zip code is invalid, the NO branch of decisional step 252 returns to state 250 where the customer may modify the zip code and repeat the validation process. If the zip code is valid, the YES branch of decisional step 252 proceeds to step 254 where the delivery information of the new recipient is stored to the information storage device 24. Step 254 returns to state 108 where the recipient list menu is displayed and the customer may select the new recipient.

Returning to state 250 in which a recipient's information is displayed, the customer can erase that recipient by selecting the clear function. Upon receipt of that function, the clear branch of state 250 leads to step 256 where the recipient's information is erased. Step 256 returns to state 108 where the recipient list menu is displayed.

To add a new recipient to the list, the customer selects the new recipient function. Upon receipt of that selection, the new recipient branch of state 108 leads to state 260 where a screen is displayed for entering information for a new recipient. The recipient entry screen is shown by the screen display of FIG. 11B. The customer enters information for the new recipient and then selects the "OK" function. Upon receipt of that function, the OK branch of state 260 leads to step decisional 262 where the zip code is validated. Steps 262–264 for validating the zip code and storing the recipient information are similar to steps 252–254 and will thus not be separately described.

To find a wanted recipient, the customer may sort and search the recipient list from the recipient list menu. Steps 270–272 for sorting the list and steps 274–278 for searching the list are similar to steps 130–132 and steps 140–144 of FIG. 5, respectively. Accordingly, they will not be separately described. The screen for searching and sorting the list is shown by the screen display of FIG. 11C.

From the screen display of FIG. 11C, the customer may also choose to remove a recipient from the list. The remove branch of state 108 leads to state 280 where the recipient list is displayed for selection of a recipient to remove. Upon a selection of a recipient, that recipient is erased from the information storage device 24 at step 282. Step 282 returns to state 108 where the recipient list menu is displayed.

Thus, the present invention provides an intelligent telephone for preparing an electronic shipping record of a parcel. The intelligent telephone displays a parcel shipping procedure as a menu of choices for selection and stores delivery information received via the parcel shipping procedure as a shipping record. In the parcel shipping procedure, non-selectable features of the parcel shipping procedure are disabled and displayed in a dimmed style to indicate the same. Upon completion of a shipping record, a label is printed for affixation to the parcel. Shipping records are transmitted to a central computer to update a tracking database and a billing database. Additionally, the intelligent telephone provides access to tracking and billing databases.

Programmers of ordinary skill in the art will be able to provide software to carry out the specific functions described above. Furthermore, those skilled in the art will understand that the various steps of the present invention may include other error branches that cause the process to abort if an error condition exists in the smart phone 14. Such error branches are well known in the art and are not directly related to the present invention. Accordingly, they will not be further described.

From the foregoing description of the preferred embodiments and the several alternatives, other alternative constructions of the present invention may suggest themselves to those skilled in the art. Therefore, the scope of the present invention is to be limited only to the claims below and the equivalents thereof.

What is claimed is:

1. A system for preparing an electronic shipping record for a parcel, and for ordering and tracking parcel deliveries, comprising:
   (a) a central computer including a tracking database for a plurality of parcels, and means for receiving a parcel pickup request, said central computer for downloading a parcel shipping procedure; and
   (b) an intelligent telephone, comprising:
   (1) an input device for receiving information;
   (2) a data transfer device for receiving information from said central computer;
   (3) an information storage device;
   (4) a screen device for displaying information; and
   (5) a processor coupled to said input device, said data transfer device, said information storage device, and said screen device, said processor for:
   (A) communicating with said central computer via a network;
   (B) receiving and storing said parcel shipping procedure from said central computer;
   (C) displaying said parcel shipping procedure with said screen device as a menu of choices for selection;
   (D) receiving via said parcel shipping procedure delivery information relating to a parcel;
   (E) storing said delivery information as a shipping record of said parcel; and
   (F) transmitting said shipping record of said parcel to said parcel pickup request receiving means and to said tracking database, in response to receiving said delivery information.

2. The system for preparing an electronic shipping record as recited in claim 1, wherein said input device comprises a set of programmable keys.

3. The system for preparing an electronic shipping record as recited in claim 1, wherein said input device is a touch sensitive device associated with said screen.

4. The system for preparing an electronic shipping record as recited in claim 1, wherein said processor is for printing a label for affixation to said parcel, said label including said delivery information.

5. The system for preparing an electronic shipping record as recited in claim 1, wherein said processor is further for generating a bit map including said delivery information.

6. The system for preparing an electronic shipping record as recited in claim 5, wherein said processor is further for printing a label from said bit map.

7. The system for preparing an electronic shipping record as recited in claim 1, wherein said processor is further for printing a machine readable label for affixation to said parcel, said label including said delivery information.

8. The system for preparing an electronic shipping record as recited in claim 1, wherein said processor is further for generating a bit map of a machine readable label.

9. The system for preparing an electronic shipping record as recited in claim 8, wherein said processor is further for printing a machine readable label from said bit map.

10. The system for preparing an electronic shipping record as recited in claim 1, wherein said delivery information includes an identification number of said parcel and wherein said processor is further operative to generate said identification number of said parcel.

11. The system for preparing an electronic shipping record as recited in claim 1, wherein said central computer further comprises a billing database for storing a billing record associated with shipping said parcel, said billing record determined from said shipping record.

12. The system for preparing an electronic shipping record as recited in claim 1, wherein said processor is further for transmitting information to said central computer to track said parcel.

13. The system for preparing an electronic shipping record as recited in claim 1, wherein said delivery information includes a recipient of said parcel and wherein said processor is further for transmitting information to said central computer to track said parcel by said recipient.

14. The system for preparing an electronic shipping record as recited in claim 1, wherein said delivery information includes a shipping date of said parcel and wherein said processor is further for transmitting information to said central computer to track said parcel by said shipping date.

15. The system for preparing an electronic shipping record as recited in claim 1, wherein sail processor is further operative to transmit information to said central computer to indicate said parcel is ready for shipment.

16. A method for preparing an electronic shipping record of a parcel and parcel delivery, comprising:
(a) receiving a parcel shipping procedure from a remote computer via a network;
(b) displaying on a screen of an intelligent telephone said parcel shipping procedure as a menu of choices for selection;
(c) recording via said parcel shipping procedure delivery information relating to a parcel; and
(d) transmitting said delivery information and a parcel pickup request to said remote computer in response to receiving said delivery information, wherein a pickup of said parcel and a tracking database entry for said parcel is initiated from said central computer.

17. The method for preparing an electronic shipping record as recited in claim 16, further comprising the step of updating a billing database.

18. The method for preparing an electronic shipping record as recited in claim 16, further comprising the step of printing a label for affixation to said parcel, said label including said delivery information.

19. The method for preparing an electronic shipping record as recited in claim 16, further comprising the step of generating a bit map including said delivery information.

20. The method for preparing an electronic shipping record as recited in claim 19, further comprising the step of printing a label from said bit map.

21. The method for preparing an electronic shipping record as recited in claim 16, wherein said delivery information includes an identification number of said parcel, further comprising the step of generating said identification number of said parcel.

22. The method of preparing an electronic shipping record as recited in claim 16, further comprising the step of transmitting information to a central computer to indicate said parcel is ready for shipment.

23. A system for preparing an electronic shipping record for a parcel, and for ordering and tracking parcel deliveries, comprising:
(a) a central computer including a tracking database for a plurality of parcels, a recipient list, means for receiving a parcel pickup request, and means for downloading a parcel shipping procedure; and
(b) an intelligent telephone, comprising:
(1) an input device for receiving information, wherein said input device comprises a set of programmable keys;
(2) a data transfer device for receiving information from said central computer;
(3) an information storage device;
(4) a screen device for displaying information; and
(5) a processor coupled to said input device, said data transfer device, said information storage device, and said screen device, said processor for:
(A) receiving and storing said parcel shipping procedure from said computer;
(B) receiving and storing said recipient list from said computer;
(C) displaying said parcel shipping procedure with said screen device as a menu of choices for selection;
(D) receiving via said parcel shipping procedure delivery information relating to a parcel, said delivery information including an identification number of said parcel;
(E) displaying said recipient list with said screen device when preparing said parcel for shipping;
(F) storing said delivery information as a shipping record of said parcel, wherein said delivery information includes a zip code of a delivery address of said parcel;
(G) validating said zip code;
(H) automatically transmitting said shipping record of a said parcel to said central computer to said parcel pickup request receiving means and to said tracking database, in response to receiving said delivery information.
(I) disabling non-selectable features of said parcel shipping procedure;
(J) printing a label for affixation to said parcel, said label including said delivery information;
(K) generating a bit map including said delivery information;
(L) printing a label from said bit map;
(M) printing a machine readable label for affixation to said parcel, said label including said delivery information;
(N) generating a bit map of a machine readable label;
(O) printing a machine readable label from said bit map; and
(P) generating said identification number of said parcel.

24. A system for preparing an electronic shipping record for a parcel, and for ordering and tracking parcel deliveries, comprising:
(a) a central computer including a tracking database for a plurality of parcels, said central computer configured to receive a parcel pickup request and to download a parcel shipping procedure; and
(b) art intelligent telephone, comprising:
(1) an input device for receiving information;
(2) a data transfer device for receiving information from said central computer;
(3) an information storage device;
(4) a screen device for displaying information; and
(5) a processor coupled to said input device, said data transfer device, said information storage device, and said screen device, said processor for:
(A) communicating with said central computer via a network;
(B) receiving and storing said parcel shipping procedure from said central computer;
(C) displaying said parcel shipping procedure with said screen device as a menu of choices for selection;
(D) receiving via said parcel shipping procedure delivery information relating to a parcel;
(E) storing said delivery information as a shipping record of said parcel; and
(F) transmitting said shipping record of said parcel to said tracking database, in response to receiving said delivery information.

\* \* \* \* \*

UNITED STATES PATENT AND TRADEMARK OFFICE
CERTIFICATE OF CORRECTION

PATENT NO.    : 6,889,194 B1
DATED         : May 3, 2005
INVENTOR(S)   : Kadaba

It is certified that error appears in the above-identified patent and that said Letters Patent is hereby corrected as shown below:

Title page,
Item [*] Notice, delete "1,724" and insert -- 862 --.

Signed and Sealed this

Twenty-third Day of August, 2005

JON W. DUDAS
*Director of the United States Patent and Trademark Office*